(12) United States Patent
Lee et al.

(10) Patent No.: US 9,521,193 B2
(45) Date of Patent: Dec. 13, 2016

(54) METHOD AND APPARATUS FOR PROVIDING AND RECEIVING CONTENTS VIA NETWORK, METHOD AND APPARATUS FOR BACKING UP DATA VIA NETWORK, BACKUP DATA PROVIDING DEVICE, AND BACKUP SYSTEM

(75) Inventors: Keum-koo Lee, Seongnam-si (KR); Ju-yun Sung, Yongin-si (KR); Sun-ae Kim, Seoul (KR); Hee-jeong Choo, Anyang-si (KR); Ji-young Kwahk, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 12/861,554

(22) Filed: Aug. 23, 2010

(65) Prior Publication Data
US 2011/0047190 A1    Feb. 24, 2011

(30) Foreign Application Priority Data

Aug. 21, 2009  (KR) ........................ 10-2009-0077875
Oct. 30, 2009  (KR) ........................ 10-2009-0104663
Oct. 30, 2009  (KR) ........................ 10-2009-0104664

(51) Int. Cl.
*G06F 17/30*  (2006.01)
*H04L 29/08*  (2006.01)

(52) U.S. Cl.
CPC ..... *H04L 67/1095* (2013.01); *G06F 17/30265* (2013.01); *H04L 67/2804* (2013.01); *H04L 67/2828* (2013.01); *H04L 67/2842* (2013.01); *H04L 67/06* (2013.01)

(58) Field of Classification Search
None
See application file for complete search history.

(56) References Cited

U.S. PATENT DOCUMENTS

| 7,145,492 | B2 |   | 12/2006 | Hirano et al. |
| 8,060,659 | B2 | * | 11/2011 | Ichieda ............................. 710/5 |
| 8,490,147 | B2 | * | 7/2013 | Lee ..................... H04L 12/2803 725/109 |

(Continued)

FOREIGN PATENT DOCUMENTS

| CA | 2 756 085 | 10/2010 |
| CN | 1460940 | 12/2003 |

(Continued)

OTHER PUBLICATIONS

Indonesian Office Action dated Jun. 26, 2013 issued in counterpart application No. W00201201056.

(Continued)

*Primary Examiner* — Bai D. Vu
(74) *Attorney, Agent, or Firm* — Sughrue Mion, PLLC

(57) ABSTRACT

Provided are methods and apparatuses for providing contents via a network, in which original data of contents provided via a network can be traced, and contents that are modified according to performance of a contents receiving device is provided. Location information of original contents is added to metadata of contents provided via the network to thereby increase convenience of access to the original contents and modify attributes of contents that are provided, to be suitable for the performance of the contents receiving device.

29 Claims, 22 Drawing Sheets

(56) References Cited

U.S. PATENT DOCUMENTS

| | | | |
|---|---|---|---|
| 2001/0012051 A1* | 8/2001 | Hara et al. ............... | 348/14.01 |
| 2002/0051181 A1 | 5/2002 | Nishimura | |
| 2002/0152318 A1 | 10/2002 | Menon et al. | |
| 2003/0061281 A1* | 3/2003 | Miyazaki .................. | 709/203 |
| 2003/0229667 A1* | 12/2003 | Pedersen et al. ........... | 709/206 |
| 2004/0024828 A1* | 2/2004 | Miyagi et al. ............ | 709/206 |
| 2004/0101212 A1* | 5/2004 | Fedorovskaya ... | G06F 17/30265 382/305 |
| 2004/0128697 A1* | 7/2004 | Wood et al. ............... | 725/115 |
| 2004/0172376 A1* | 9/2004 | Kobori et al. .............. | 707/1 |
| 2004/0215659 A1* | 10/2004 | Singfield et al. .......... | 707/104.1 |
| 2005/0138137 A1* | 6/2005 | Encarnacion et al. ........ | 709/217 |
| 2005/0254072 A1 | 11/2005 | Hirai et al. | |
| 2005/0281185 A1* | 12/2005 | Kawasaki ................ | 369/275.3 |
| 2006/0059094 A1* | 3/2006 | Oh et al. .................... | 705/51 |
| 2006/0062362 A1 | 3/2006 | Davis | |
| 2006/0129578 A1* | 6/2006 | Kim ......................... | 707/100 |
| 2006/0161635 A1* | 7/2006 | Lamkin et al. ............. | 709/217 |
| 2007/0185972 A1* | 8/2007 | Won ....................... | H04N 7/17318 709/217 |
| 2007/0211160 A1 | 9/2007 | Katayama et al. | |
| 2007/0276849 A1 | 11/2007 | Konno et al. | |
| 2007/0288441 A1 | 12/2007 | Wolff et al. | |
| 2008/0077703 A1* | 3/2008 | Lee .......................... | 709/232 |
| 2008/0092240 A1* | 4/2008 | Sitrick .................... | G06F 21/10 726/27 |
| 2009/0083412 A1 | 3/2009 | Olaiya | |
| 2010/0023983 A1 | 1/2010 | Choi et al. | |
| 2010/0242087 A1* | 9/2010 | Matsumoto ................. | 726/3 |

FOREIGN PATENT DOCUMENTS

| | | |
|---|---|---|
| CN | 1510903 A | 7/2004 |
| CN | 1282934 | 11/2006 |
| CN | 101018139 A | 8/2007 |
| EP | 1102178 A2 | 5/2001 |
| EP | 1 675 011 | 6/2006 |
| EP | 1 898 322 | 3/2008 |
| JP | 2000339227 A | 12/2000 |
| JP | 2001-306388 A | 11/2001 |
| JP | 2002-007914 | 1/2002 |
| JP | 2002-111893 | 4/2002 |
| JP | 2004-274710 | 9/2004 |
| JP | 2005-182588 | 7/2005 |
| JP | 2006-24218 A | 1/2006 |
| JP | 2006139632 A | 6/2006 |
| JP | 2006-295509 | 10/2006 |
| JP | 2007-221723 A | 8/2007 |
| JP | 2007-243625 A | 9/2007 |
| JP | 2007-527575 | 9/2007 |
| JP | 2008-083738 | 4/2008 |
| JP | 2008-250864 | 10/2008 |
| JP | 2009-163572 A | 7/2009 |
| KR | 10-2004-0047207 A | 6/2004 |
| KR | 100590473 | 6/2006 |
| KR | 100677564 | 2/2007 |
| KR | 1020070028960 | 3/2007 |
| KR | 10-0717059 B1 | 5/2007 |
| KR | 10-2007-0063676 A | 6/2007 |
| KR | 10-0777480 B1 | 11/2007 |
| KR | 1020080003961 | 1/2008 |
| KR | 1020080093246 | 10/2008 |
| KR | 1020090082068 | 7/2009 |
| RU | 2 297 665 | 8/2005 |
| WO | WO 03/012680 | 2/2003 |
| WO | WO 2006/022006 | 3/2006 |
| WO | WO 2006/066052 | 6/2006 |
| WO | WO 2007/076459 | 7/2007 |

OTHER PUBLICATIONS

Mexican Office Action dated Jun. 27, 2013 issued in counterpart application No. MX/a/2012/000294.
Katsutoshi Ando et al., "A Method for Embedding Binary Data into JPEG2000 Images Using Layer Function", The Institute of Electronics, Information, and Communication Engineers, vol. No. J85-D-11, Issue No. 10, pp. 1522 to 1530, ISSN 0915-1923 (Reference literature A), Oct. 1, 2002.
European Search Report dated Oct. 2, 2014 issued in counterpart application No. 10173732.8-1870.
Communication issued Feb. 10, 2015 by the State Intellectual Property Office of P.R. China in counterpart Chinese Application No. 201080041875.6.
Communication issued Mar. 23, 2015 by the Japan Patent Office in counterpart Japanese Application No. 2010-186291.
Communication dated Jul. 27, 2015, issued by the Japanese Intellectual Property Office in counterpart Japanese Application No. 2014-215648.
Communication dated Aug. 7, 2015, issued by the Taiwanese Intellectual Property Office in counterpart Taiwanese Application No. 099128110.
Communication dated Sep. 1, 2015, issued by the State Intellectual Property Office of P.R. China in counterpart Chinese Application No. 201080041875.6.
"Reaction, Digital camera image utilization technique", PC Japan, Softbank Creative Corporation, Jun. 1, 2008, vol. 13, No. 13, p. 128-131 (Total 6 pages).
Communication dated Oct. 27, 2015 issued by Korean Intellectual Property Office in counterpart Korean Patent Application No. 10-2009-0104664.
Communication dated Dec. 16, 2015 issued by Korean Intellectual Property Office in counterpart Korean Patent Application No. 10-2009-0104663.
Communication dated Jan. 8, 2016 issued by Japanese Intellectual Property Office in counterpart Japanese Patent Application No. 2014-215648.
Communication dated Apr. 29, 2016 issued by the State Intellectual Property Office of P.R. China in counterpart Application No. 201080041875.6.
Communication dated Jul. 4, 2016 issued by the Japanese Patent Office in counterpart Application No. 2015-146133.
Communication dated Jul. 26, 2016, issued by the Korean Intellectual Property Office in counterpart Korean Patent Application No. 10-2009-0104664.

* cited by examiner

| METADATA | | |
|---|---|---|
| CONTENTS METADATA | CONTENTS ID | |
| | LOCATION INFORMATION OF ORIGINAL CONTENTS | |
| | ORIGINAL CONTENTS ACCESS RIGHTS INFORMATION | |
| DEVICE METADATA | CONTENTS TRANSFER PATH | |
| USER METADATA | EDITING HISTORY | |
| | ACCOUNT INFORMATION | |

FIG. 11

|  | RESOLUTION | STORAGE CAPACITY | SUPPORTED CODEC | USER SETUP |
|---|---|---|---|---|
| DEVICE 1 | 640X480 | 20/500GB | DivX, MPEG4, JPEG | 320X240, DivX |
| DEVICE 2 | 800X480 | 340/830GB | DivX, WMV9, H.264, JPEG | 700X480, H.264 |
| ⋮ | ⋮ | ⋮ | ⋮ | ⋮ |

METHOD AND APPARATUS FOR PROVIDING AND RECEIVING CONTENTS VIA NETWORK, METHOD AND APPARATUS FOR BACKING UP DATA VIA NETWORK, BACKUP DATA PROVIDING DEVICE, AND BACKUP SYSTEM

PRIORITY

This application claims priority under 35 U.S.C. §119 (a) to Korean Patent Application No. 10-2009-0077875, filed on Aug. 21, 2009, Korean Patent Application No. 10-2009-0104663, filed on Oct. 30, 2009, and Korean Patent Application No. 10-2009-0104664, filed on Oct. 30, 2009, in the Korean Intellectual Property Office, the disclosures of which are incorporated herein in their entirety by reference.

BACKGROUND OF THE INVENTION

1. Field of the Invention

The present invention generally relates to methods and apparatuses for providing contents via a network, and more particularly, to methods and apparatuses for providing contents via a network, in which original data of the contents may be provided via the network for use. The present invention further relates to a method and apparatus for efficiently backing up data to a plurality of storage devices connected via a network, a backup data providing device, and a backup system.

2. Description of the Related Art

The term "contents" generally refers to various data such as characters, symbols, voice, images, or videos used via wired or wireless networks. Due to the development of information technology such as that provided by the Internet, digital cameras, and mobile phones, meaningful information has been made available much quicker than conventional media, and people are able to share their own contents with other users via communication networks.

Contents may be shared by users who are interconnected via networks by using various methods, for example, via a webpage, a blog or a webzine in a notice board format. In general, contents represented on a webpage are transcoded or resized to a suitable format for the webpage and provided to other users via a network. For example, when a user presents his/her photographs through a blog, the user edits the photographs by reducing a size or capacity of the original photographs so as to upload them on the blog.

However, according to conventional methods, contents provided via a network might be different from the original contents, and those wanting to use original contents may have difficulty in using the original contents.

Recently, various content receiving devices have become available which include Personal Digital Assistants (PDAs), smartphones, Portable Multimedia Players (PMP), netbooks, and the like. Since these content receiving devices operate differently due to differences in resolution or available codecs, the performance of the devices needs to be considered when providing contents to the various types of content receiving devices.

Recently, with increasing demands for better hardware performance and higher quality data, various types of devices, including cameras, camcorders, PCs, netbooks, smartphones, and PVRs (Personal Video Recorders) are now able to process larger sized data. Though the advance in memory technology has increased the storage capacities of such devices, the size of moving picture data or audio data is still high in consideration of the limited data storage capacity of the devices.

SUMMARY OF THE INVENTION

The embodiments of the present invention provide methods and apparatuses for providing contents via a network in which convenience of accessing original contents is increased by providing location information of the original contents, and methods and apparatuses for receiving the contents.

The embodiments of the present invention also provide methods and apparatuses for modifying contents to be suitable for performance of a content receiving device and providing the modified contents.

The embodiments of the present invention further provide a data backup method and apparatus for backing up data stored in a certain device to a storage device connected to the device via a network. In particular, the embodiments provide a method and apparatus for efficiently backing up data by using another storage device connected via a network when a particular data storage device connected to the network is unavailable to back up data.

According to an aspect of the present invention, there is provided a content providing method performed via a network, the method including storing original contents in a predetermined storage device; modifying attributes of the original contents to generate modified contents; generating metadata including location information of the storage device in which the original contents are stored; and providing the modified contents and the metadata to a device interconnected via the network.

According to another aspect of the present invention, there is provided a content receiving method performed via a network, the method including receiving predetermined contents; extracting location information of original contents from metadata of the contents; and receiving the original contents from a predetermined storage device interconnected via the network, using the extracted location information of the original contents.

According to another aspect of the present invention, there is provided a content providing device for providing contents via a network, the device including an original content modifying unit that modifies attributes of original contents to generate modified contents; a metadata generating unit that generates metadata including location information of a predetermined storage device in which the original contents are stored; and a content providing unit that provides the modified contents and the metadata to a device interconnected via the network.

According to another aspect of the present invention, there is provided a content receiving device for receiving contents via a network, the device including a content receiving unit that receives predetermined contents; and an additional data extracting unit that extracts location information of original contents from metadata of the contents, wherein the content receiving unit receives the original contents from a predetermined storage device interconnected via the network by using the extracted location information of the original contents.

According to another aspect of the present invention, there is provided a content providing method performed via a network, the method including obtaining status information of a device to which contents are to be transferred; modifying attributes of the contents that are to be provided to the device by using the status information of the device; and providing the modified contents to the device.

According to another aspect of the present invention, there is provided a content providing device for providing contents via a network, the device including a contents storing unit that stores predetermined contents; a communication unit that receives status information of a device to which the contents are to be transferred; a device information storing unit that stores the received status information of the device; and a content modifying unit that modifies attributes of the contents that are to be provided to the device by using the status information of the device.

According to another aspect of the present invention, there is provided a content receiving method performed via a network, the method including selecting contents to be received, among contents provided by a predetermined content providing device; transmitting status information of a device that receives the content, to the contents providing device; and receiving contents with attributes modified according to the status information of the device.

According to another aspect of the present invention, there is provided a content receiving device for receiving contents via a network, the device including a user interface via which contents to be received among contents provided by a predetermined content providing device is selected; and a communication unit that transmits status information of a device that receives the contents, to the content providing device, and receives contents with attributes modified according to the status information of the device.

According to another aspect of the present invention, there is provided a data backup method via a network, including determining whether a first storage device connected to a data providing device via a network is available to store data; transferring the data stored in the data providing device to a second storage device that is connected via the network and is available to store the data, if the first storage device is unavailable to store the data; storing the transferred data in the second storage device; and determining whether the first storage device is available to store the data and transferring the data stored in the second storage device to the first storage device to store the data in the first storage device if the first storage device is available to store the data.

According to another aspect of the present invention, there is provided a data backup system via a network, including a data providing device providing backup data; a plurality of storage devices connected to the data providing device via the network; and a backup control unit that controls the operations of determining whether a first storage device selected from among the plurality of storage devices is available to store the backup data, storing the backup data provided by the data providing device in a second storage device selected from among the plurality of storage devices if the first storage device is unavailable to store the backup data; and transferring and storing the backup data stored in the second storage device in the first storage device if the first storage device becomes available to store the backup data.

According to another aspect of the present invention, there is provided a data providing device including a communication unit that communicates with a plurality of storage devices connected via a network; a storage unit that stores backup data; and a control unit that controls the operations of determining whether a first storage device selected from among the plurality of storage devices is available to store the backup data, and transferring the backup data stored in the storage unit to a second storage device selected from among the plurality of storage devices via the communication unit if the first storage device is unavailable to store the backup data.

According to another aspect of the present invention, there is provided a data backup system including a communication unit that communicates with at least one data storage device and a data providing device connected via a network; a storage unit that stores data provided via the communication unit; and a control unit that controls the operations of receiving and storing data provided by the data storage device in the storage unit if the at least one data storage device is unavailable to store the data, determining whether the at least one data storage device is available to store the data, and transferring the data stored in the storage unit to the at least one data storage device via the communication unit if the at least one storage data device becomes available to store the data.

According to another aspect of the present invention, there is provided a data backup system including a communication unit that communicates with at least one storage device and a data providing device connected via a network; a storage unit that stores data provided via the communication unit; and a control unit that controls the operation of notifying the at least one storage device and the data providing device via the communication unit that the storage unit is unavailable to store the data provided by one of the at least storage device and the data providing device, notifying the at least one storage device and the data providing device via the communication unit that the storage unit is available to store the data, and storing the data provided via the communication unit in the storage unit.

BRIEF DESCRIPTION OF THE DRAWINGS

The above and other features and advantages of the present invention will become more apparent by describing in detail embodiments thereof with reference to the attached drawings in which:

FIG. 11 is a view illustrating device status information of a content receiving device, according to an embodiment of the present invention;

DETAILED DESCRIPTION OF THE INVENTION

The present invention will now be described more fully with reference to the accompanying drawings, in which embodiments of the invention are shown.

Figure 1:
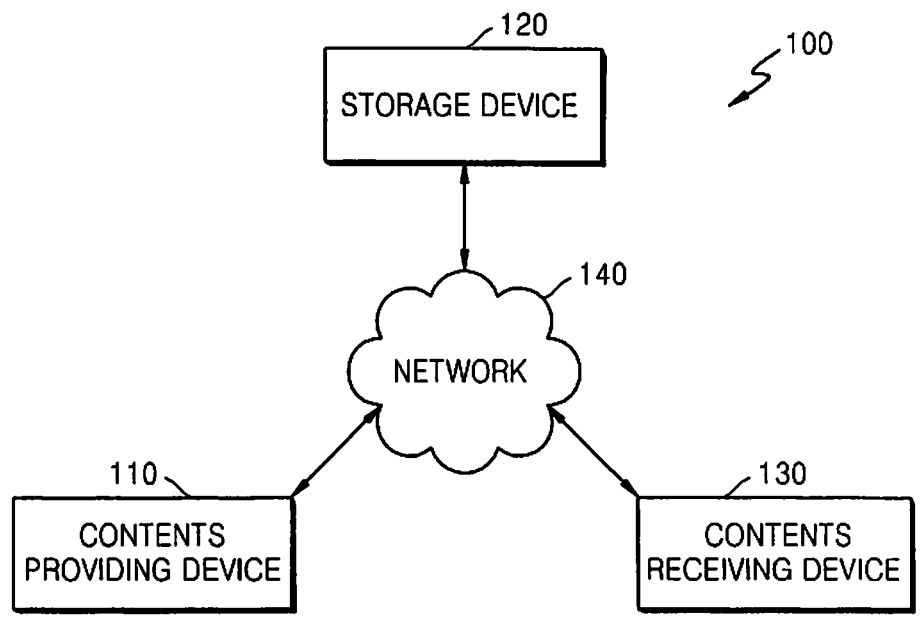
FIG. 1 is a schematic view illustrating a content sharing system that operates via a network, according to an embodiment of the present invention.

FIG. 1 is a schematic view illustrating a contents sharing system 100 that operates via a network, according to an embodiment of the present invention.

Referring to FIG. 1, the content sharing system 100 includes a content providing device 110, a storage device 120, and a content receiving device 130, which are interconnected via a predetermined network 140.

The content providing device 110 and the content receiving device 130 may be any of a variety of devices supporting various types of wired or wireless networks 140, for example, a Portable Multimedia Player (PMP), an Ultra Mobile Personal Computer (UMPC), a laptop computer, a mobile phone, a digital camera, or a Personal Computer (PC). Also, the content providing device 110, the storage device 120, and the content receiving device 130 may be client devices constituting a home network system connected to a controller such as a home gate or a home server. For example, the content providing device 110, the storage device 120, and the content receiving device 130 may be devices interconnected via the network 140 complying with a Digital Living Network Alliance (DLNA) standard for the control of home electronic appliances to share contents.

The network 140 comprises one of a short-distance network and a long-distance network. The network 140 may use a wireless Internet scheme such as Bluetooth®, Wi-Fi, Wireless Broadband (WiBro), Ultra Wide Band (UWB), or the like, or a wired Internet scheme such as Institute of Electrical and Electronics Engineers (IEEE) 1394, Ethernet, etc.

The storage device 120 is a network storage device for storing original contents. The storage device 120 may be a storage device accessible via a network. For example, the storage device 120 may be a Network Attached Storage (NAS). Although in the embodiment of FIG. 1, the storage device 120 storing the original contents is separated from the content providing device 110, the storage device 120 may be integrated with the content providing device 110.

The content providing device 110 modifies attributes of original contents stored in the storage device 120 to produce modified contents, and generates location information of the storage device 120 as metadata.

The content receiving device 130 extracts location information of the storage device 120 in which the original contents are stored, from the modified contents and metadata provided by the content providing device 110, and accesses the storage device 120 to receive original contents.

Figure 2:
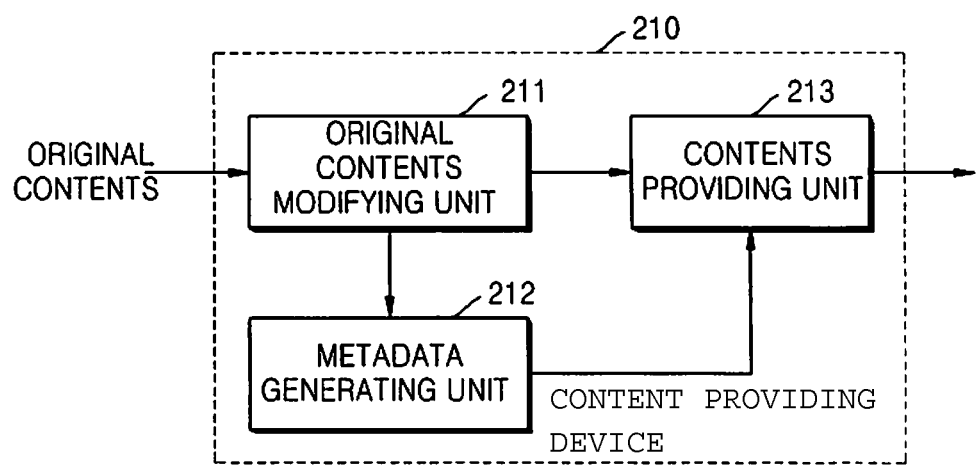
FIG. 2 is a block diagram illustrating the content providing device of FIG. 1, according to an embodiment of the present invention.

FIG. 2 is a block diagram illustrating a content providing device 210 illustrated in FIG. 1, according to an embodiment of the present invention.

Referring to FIG. 2, the content providing device 210 includes an original content modifying unit 211, a metadata generating unit 212, and a content providing unit 213.

The original content modifying unit 211 modifies attributes of original contents stored in the storage device 120, to which the original content modifying unit 211 is connected via a network as illustrated in FIG. 1, to generate modified contents.

For example, when sharing contents by uploading the contents via a webpage like a blog, a capacity of attached files supported by the webpage may be limited or a lot of time may be required for uploading. Accordingly, to efficiently provide contents on the webpage, the original content modifying unit 211 reduces the capacity of the original contents. As another example, when providing a photographic image having a high resolution to the content receiving device 130 having a limited resolution, such as a PMP or a mobile phone, the original content modifying unit 211 resizes an original image in consideration of a storage capacity or a resolution of the content receiving device 130 to generate a modified image.

Figure 3:
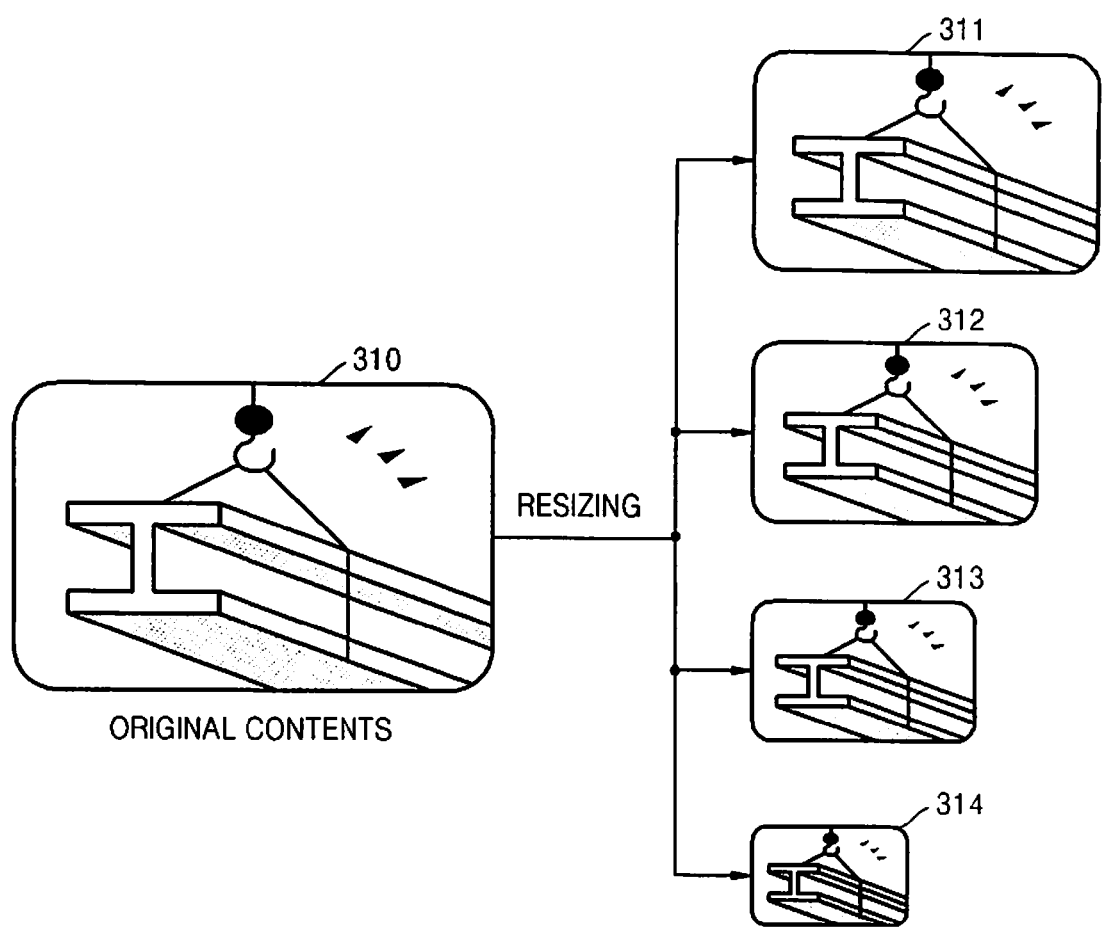
FIG. 3 is a diagram explaining a first process of an original content modifying unit of FIG. 2 for modifying attributes of original contents, according to an embodiment of the present invention.

FIG. 3 is a diagram explaining a process of the original content modifying unit 211 illustrated in FIG. 2 for modifying attributes of original contents, according to an embodiment of the present invention.

Referring to FIG. 3, for example, when a resolution of an original image 310 corresponding to original contents is 2592×1944, the original content modifying unit 211 resizes the original image 310 to generate modified images such as an image 311 having a resolution of 1920×1980, an image 312 having a resolution of 1024×768, an image 313 having a resolution of 800×480, or an image 314 having a resolution of 400×240. Resolutions of images to be uploaded to a particular webpage may be limited, and thus the original content modifying unit 211 modifies a resolution of an original image to an appropriate resolution as illustrated in FIG. 3, according to image file resolutions supported by the webpage, on which the contents are to be provided, to generate modified images.

The original content modifying unit 211 resizes original contents to generate small-capacity contents if the storage capacity of the contents receiving device 130 interconnected via the network 140 is insufficient or the resolution supported by the webpage is lower than that of the original contents. For example, when the content receiving device 130 is a mobile phone, and a display of the mobile phone has a maximum resolution of 800×480, the original content modifying unit 211 resizes an original image to a 800×480 image that is optimized for a display of the mobile phone.

When the original contents are a video file, and the content receiving device 130 does not support a codec that is used in encoding the video file, the original content modifying unit 211 transcodes the original video file to generate another video file having a video codec format that is supported by the content receiving device 130.

Meanwhile, as described above, the content providing device 210 may allow attributes of contents to be automatically modified according to the storage capacity or the resolution of the contents receiving device 130, or a user to select a method of modifying attributes of original contents via a user interface (not shown). For example, resolution information of an original image and available resolutions to modify the original image may be displayed via the user interface, and the user may select to modify the original image to have a desired resolution.

The metadata generating unit 212 generates metadata including location information of the storage device 120 in which the original contents are stored.

The content providing unit 213 provides the modified contents and metadata to a device that is interconnected via a network.

Figures 4, 5:
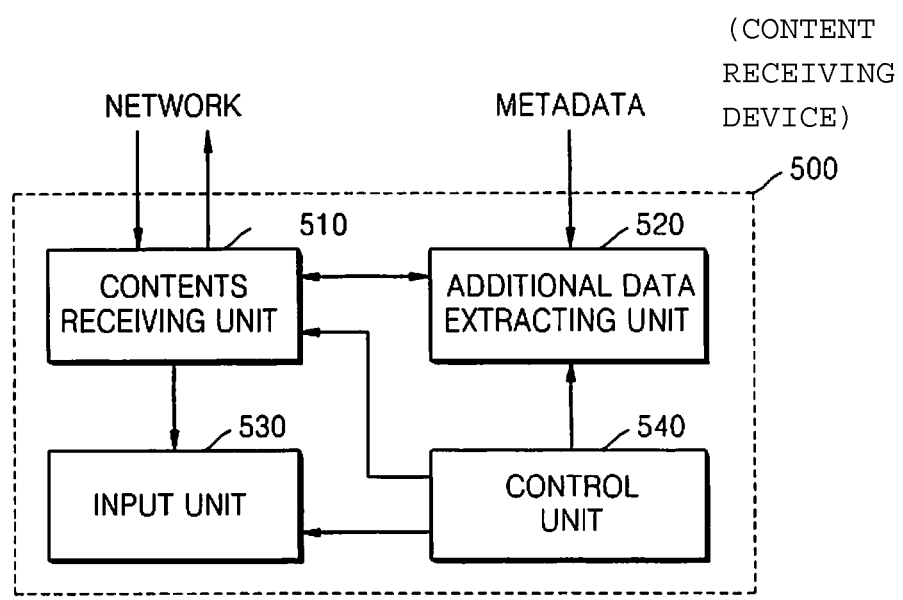
FIG. 4 is a diagram illustrating metadata according to an embodiment of the present invention.
FIG. 5 is a block diagram illustrating a content receiving device according to an embodiment of the present invention.

FIG. 4 is a diagram illustrating metadata according to an embodiment of the present invention.

Referring to FIG. 4, the metadata according to the current embodiment of the present invention includes contents metadata, device metadata, and user metadata.

The contents metadata includes a contents ID, original contents location information, and original contents access rights information.

The contents ID is used to identify the types of contents that are shared via a network. The original contents location information is location information of the storage device 120 in which original contents are stored, which may be in a Universal Resource Locator (URL) format. In detail, the original contents location information includes a protocol and a storage path of the original contents. For example, the original contents location information may be represented as a format such as "protocol://'location of a storage device storing the original contents.'" For example, if a location of the storage device 120 is represented as "http://www.samsung.com/private_contents", the URL information may be added to metadata as original contents location information.

The original contents access rights information is used to prevent original contents from being shared by any user. For example, the above-described original contents location information may be encoded, and encoding key information for decoding the encoded original contents location information may be the original contents access rights information.

The device metadata refers to information about transfer history details when modified contents are transferred between different devices. For example, when modified contents are transferred from a first device (Device ID=1) via a second device (Device ID=2) to a third device (Device ID=3), device metadata of the modified contents stored in the third device may include ID information of the first device and the second device which denote paths the contents has passed. As such, contents transfer paths and flows of illegal contents may be traced by using the device metadata.

The user metadata includes editing history and account information. Editing history includes information about edited details of the modified contents. For example, in the case of resized image contents, editing history metadata thereof may include size information of an original image and information about modified details of the original image. In the case of a transcoded video file contents, editing history metadata thereof may include codec information of an original video file. The account information denotes identification information of the user who provides the contents. For example, in the case of contents provided to a particular web bulletin board, account information thereof may be ID information of a user who uploaded the corresponding contents to the web bulletin board.

As described above, the content providing device 210 according to the current embodiment of the present invention includes location information of the original contents of the modified contents, in the metadata, and thus other devices that share the modified contents via a network may easily access the original contents by using the location information of the metadata.

FIG. 5 is a block diagram illustrating a content receiving device 500 according to an embodiment of the present invention.

Referring to FIG. 5, the content receiving device 500 includes a content receiving unit 510, an additional data extracting unit 520, an input unit 530, and a control unit 540.

The content receiving unit 510 is a communication module that performs data communication with other devices that are connected to a network and receives contents that are shared via the network.

The additional data extracting unit 520 extracts additional data of the received contents as illustrated above in FIG. 4 from metadata of the received contents. The additional data extracting unit 520 extracts location information of original contents from the metadata of the received contents, and the user selects whether to receive the original contents as necessary via the input unit 530 to allow receiving of the original contents. The control unit 540 controls operations of each of elements of the content receiving device 500.

Figure 6A:
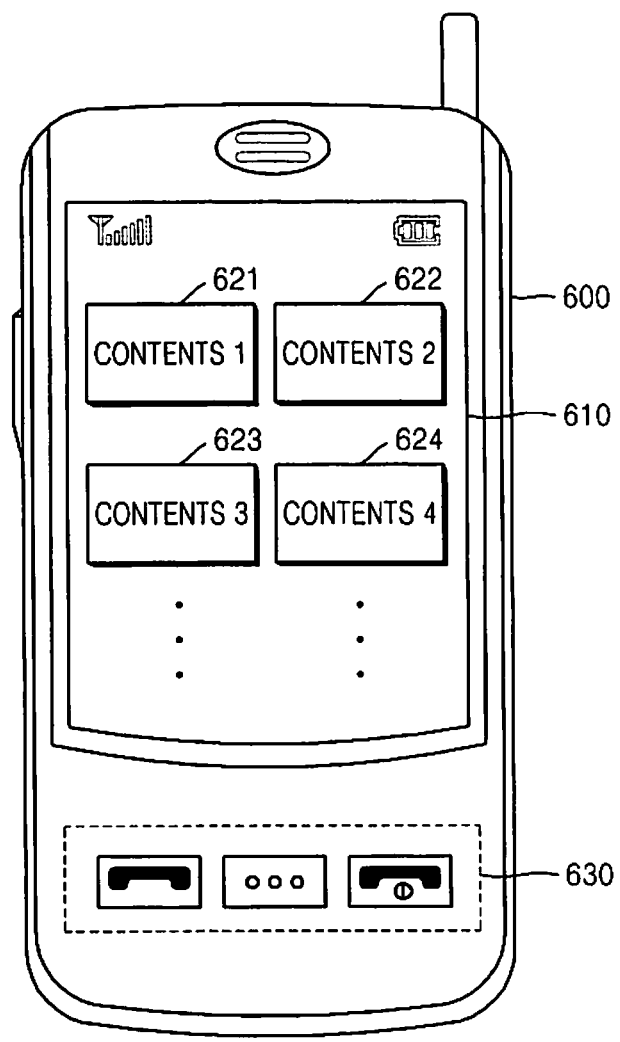
FIGS. 6A and 6B illustrate a process of receiving original contents, according to an embodiment of the present invention.
Figure 6B:
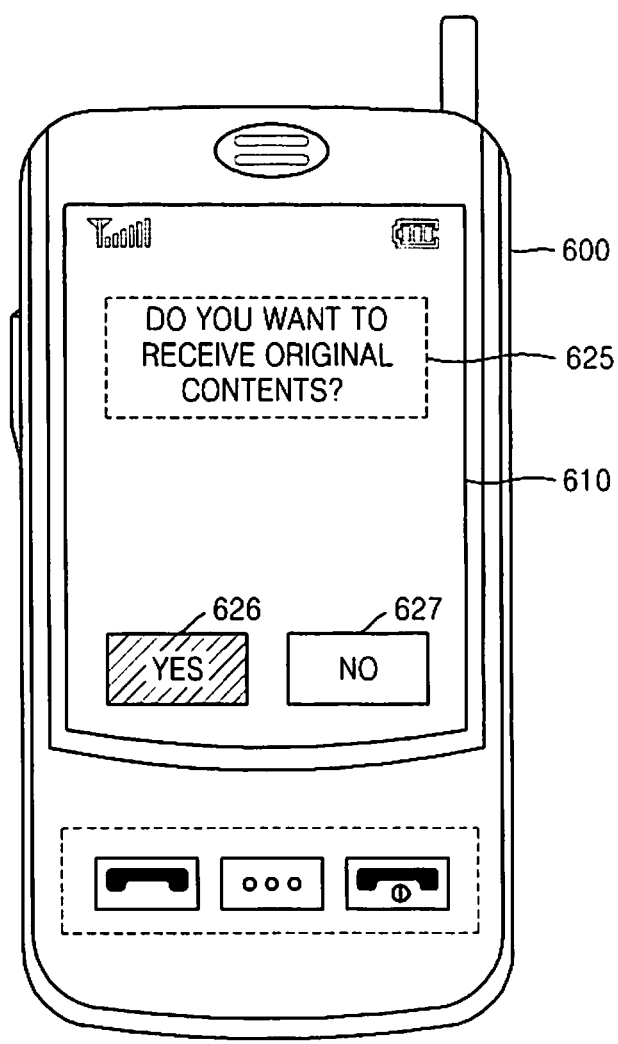

FIGS. 6A and 6B illustrate a process of receiving original contents, according to an embodiment of the present invention. In FIGS. 6A and 6B, a mobile phone 600 that supports a network connection is illustrated as a content receiving device.

Referring to FIG. 6A, when the mobile phone 600 supporting the network connection is connected via a network such as a Wi-Fi network to a predetermined webpage that provides contents, contents lists 621 through 624 are shown on a display unit 610 of the mobile phone 600. Referring to FIG. 6B, when the user selects one of contents on the contents lists 621 through 624 via an input unit 630 or by touching a desired contents region on the mobile phone 600 if the mobile phone 600 supports touch recognition, data 625 for inquiring whether the user wants to receive original contents is shown via the display unit 610, and the user selects whether to receive original contents via a selection interface 626 or 627.

When the user chooses to receive the original contents, the contents receiving unit 510 requests a storage device, in which the original contents are stored, to transfer the original contents, by using the location information of the original contents, extracted from the additional information extracting unit 520. The storage device determines whether a receiving device that has requested transfer of the original contents, has access rights to the original contents, to determine whether to transfer the original contents or not.

As described above, the access rights to the original contents may be restricted, for example, by encoding location information of the original contents stored in the metadata and granting an encoding key that can be decoded only by an authorized user, as original contents access rights information. According to another example, the storage device storing the original contents may have a list of user IDs or device IDs that have access rights to the original contents; and when a request for access to original rights is made, the storage device may allow or prohibit a request for access to original contents by determining whether the request is made by a user or a device listed on the list, to thereby selectively provide the original contents.

Figure 7:
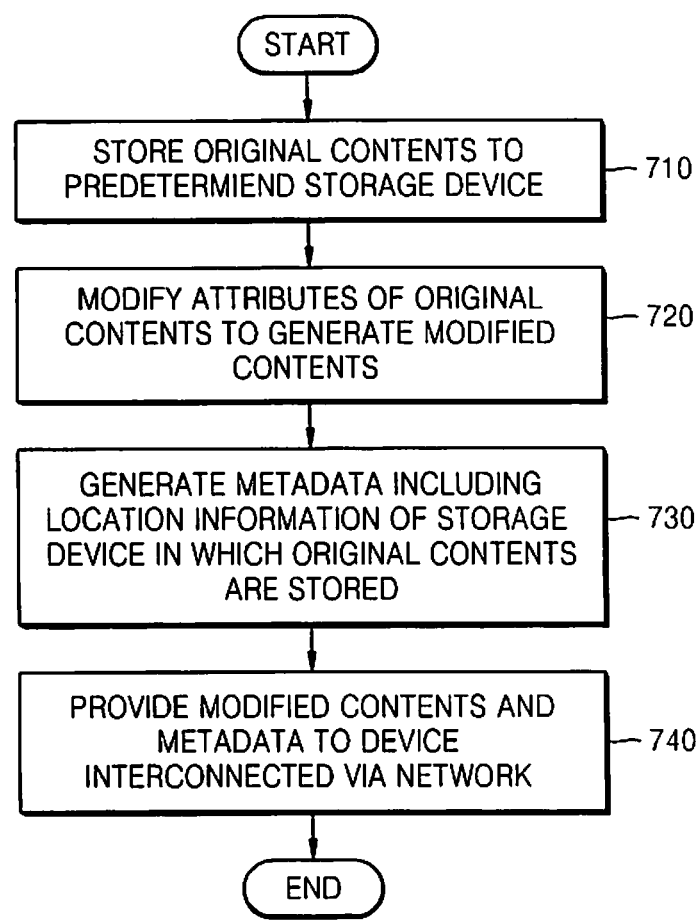
FIG. 7 is a flowchart illustrating a content providing method according to an embodiment of the present invention.

FIG. 7 is a flowchart illustrating a content providing method according to an embodiment of the present invention.

Referring to FIG. 7, in step 710, original contents are stored in a predetermined storage device. As described above, the storage device may preferably be a storage device that can be accessed via a network such as NAS.

In step 720, the original content modifying unit 211 of the content providing device 210 modifies attributes of the original contents to generate modified contents. As described above, when uploading contents to a webpage, a capacity of the original contents is reduced by considering a size of an attachment file supported by the webpage. Also, the content providing device 210 processes the original contents to be in an appropriate format for the content receiving device 220 in consideration of a storage capacity or a resolution of the content receiving device 220 to generate modified contents.

In step 730, the metadata generating unit 212 generates metadata including at least location information of the original contents. The location information refers to an access route of the storage device, in which the original contents are stored, on a network, and may be a URL format as described above.

In step 740, the modified contents and metadata are provided to other devices that are interconnected via the network by using the content providing unit 213.

Figure 8:
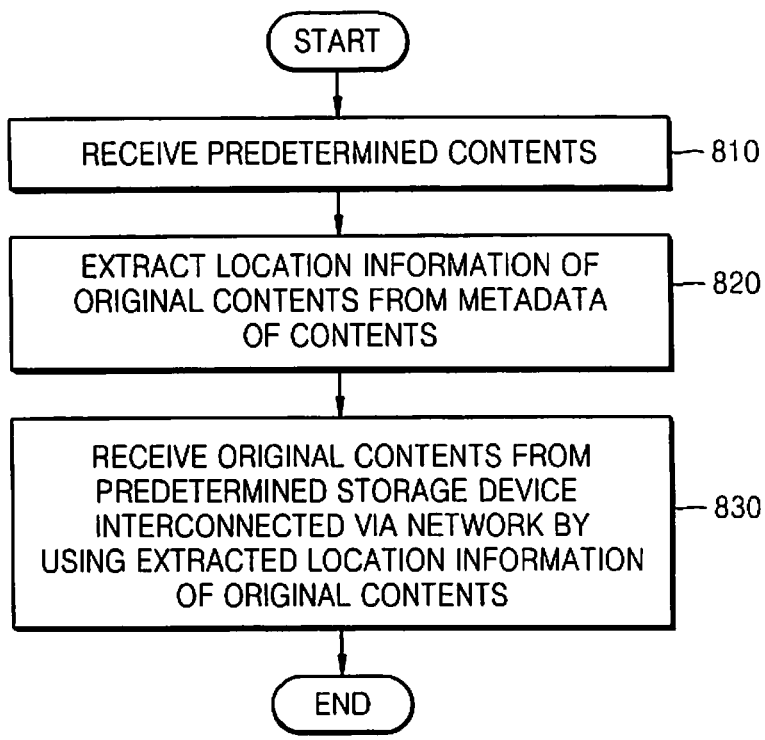
FIG. 8 is a flowchart illustrating a content receiving method according to an embodiment of the present invention.

FIG. 8 is a flowchart illustrating a content receiving method according to an embodiment of the present invention.

Referring to FIG. 8, in step 810, predetermined contents are provided from other devices interconnected via a network by using the content receiving unit 510.

In step 820, the additional data extracting unit 520 extracts location information of the original contents from the metadata of the contents.

In step 830, the content receiving unit 530 requests a storage device that stores the original contents to transfer the original contents by using the extracted location information of the original contents, and receives the original contents from the storage device.

Figure 9:
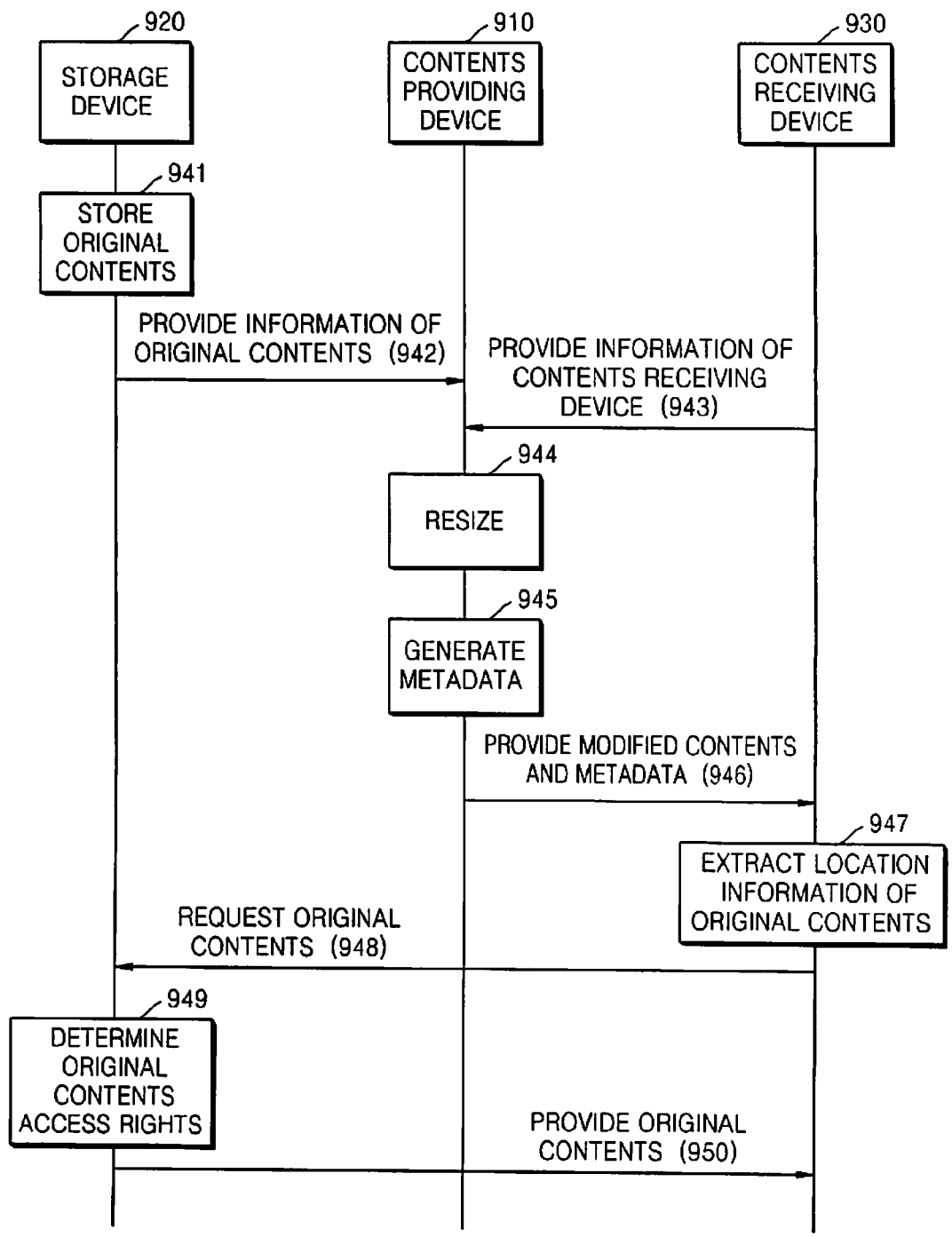
FIG. 9 is a flow diagram illustrating a process in which original contents are provided in a content sharing system, according to an embodiment of the present invention.

FIG. 9 is a flow diagram illustrating a process in which original contents are provided in a contents sharing system, according to an embodiment of the present invention.

Referring to FIG. 9, in step 941, original contents are stored in a storage device 920 that is accessible via a network. Also, in step 942, the original contents are provided to a content providing device 910. In step 943, information about a content receiving device 930, for example, a storage capacity or a resolution of the content receiving device 930, is additionally provided to the content providing device 910.

In step 944, the content providing device 910 modifies the original contents to a suitable format for the content receiving device 930 in consideration of the storage capacity or the resolution information of the content receiving device 930. For example, image contents are resized in consideration of the storage capacity and the resolution of the content receiving device 930, and video contents are transcoded in consideration of a playable codec of the content receiving device 930.

In step 945, the content providing device 910 generates metadata including location information of the storage device in which the original contents are stored. Then the content providing device 910 provides the modified contents and metadata to the content receiving device 930 interconnected via a network.

In step 947, the content receiving device 930 extracts from the metadata the location information of the storage device in which the original contents are stored. Then, in step 948, the content receiving device 930 request the storage device 920 to provide the original contents. In step 949, the storage device 920 compares a user ID or a device ID that is allowed to access the original contents with a user ID or a device ID of the content receiving device 930 that has requested the original contents so as to determine whether the request is made by a device that has access rights to the original contents. When the user ID or device ID is that of a user or a device having proper access rights, the storage device 920 provides the original contents to the contents receiving device 930 in step 950.

According to the present invention, convenience of accessing original contents may be increased by using the metadata of the contents.

Figure 10:
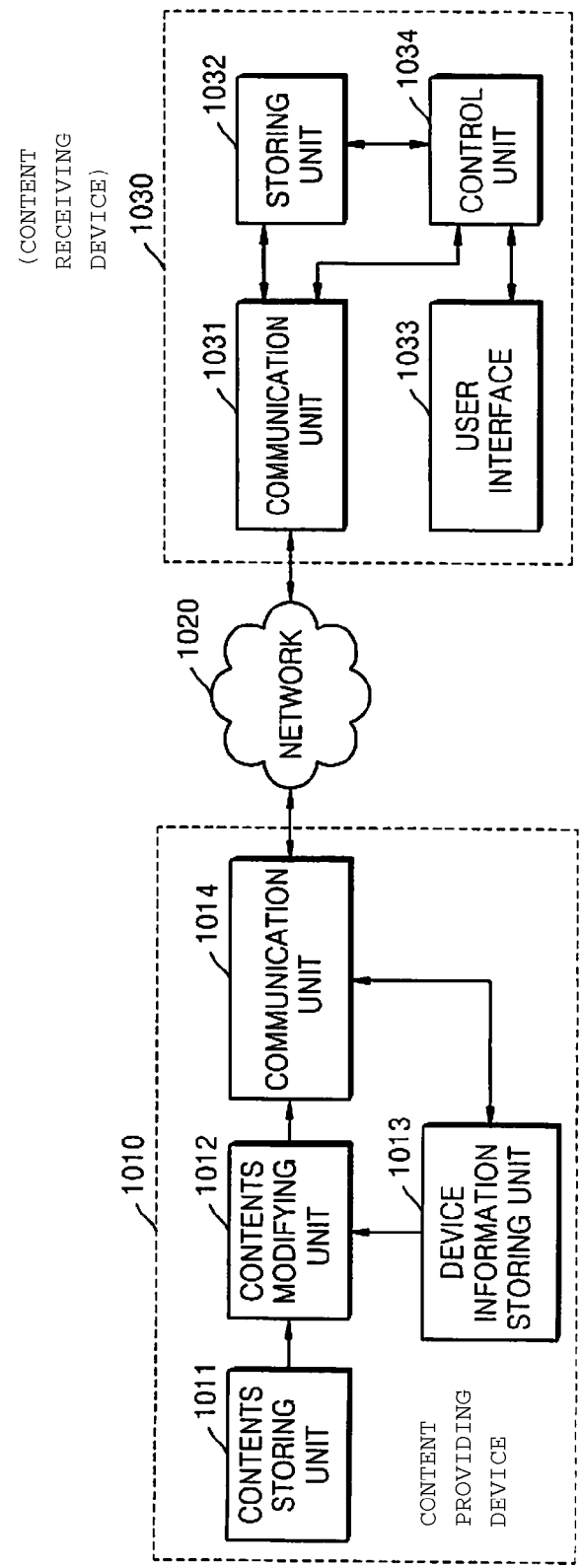
FIG. 10 is a block diagram illustrating a content sharing system that operates via a network, according to another embodiment of the present invention.

FIG. 10 is a block diagram illustrating a content sharing system that operates via a network, according to another embodiment of the present invention.

Referring to FIG. 10, the content sharing system includes a content providing device 1010 and a content receiving device 1030 that are interconnected via a predetermined network 1020.

The content providing device 1010 includes a content storing unit 1011, a content modifying unit 1012, a device information storing unit 1013, and a communication unit 1014.

The contents storing unit 1011 stores contents data that is to be provided to the content receiving device 1030.

The communication unit 1014 receives device status information of the content receiving device 1030 from the content receiving device 1030, and the received device status information is stored in the device information storing unit 1013.

FIG. 11 is a view illustrating an example of device status information of a content receiving device, according to an embodiment of the present invention.

Referring to FIG. 11, the device status information includes information about device performance such as a resolution and a storage capacity of the content receiving device, and audio/video formats supported by the content receiving device, or the like. As illustrated in FIG. 11, user setup information that is set by the user beforehand may be additionally included in the device status information. For example, referring to status information of a first device from among content receiving devices interconnected via a network, a resolution of the first device is 640×480, and a storage capacity thereof, which refers to residual capacity/total storage capacity, is 20 GB among the total of 500 GB. Also, the device status information of the first device indicates that the first device supports codecs of DivX, MPEG-4, and JPEG. Also, a resolution of 320×240 and a DivX codec are set by the user as attributes of contents to be received by the first device. The user setup information may be stored in the device status information in advance and then transferred or may be set by the user in real-time via a user interface 1033 of the contents receiving device 1030, as in FIG. 10.

Referring to FIG. 10 again, the content modifying unit 1012 obtains performance and user setup information of a current device which is to receive contents, by using status information of devices stored in the device information storing unit 1013, and modifies attributes of the contents stored in the content storing unit 1011 to be suitable for the content receiving device 1030. For example, it is assumed that the first device illustrated in FIG. 11 is a current content receiving device, and the contents being provided is a video file that has a resolution of 800×600 and is encoded by an H.264 codec. In this case, the content modifying unit 1012 modifies the resolution of the video file stored in the content storing unit 1011 to 640×480 according to the resolution of the first device or to 320×240 according to the user setup information, and modifies the attributes of the video file by transcoding the H.264 codec which is not supported by the first device to a DivX codec or an MPEG4 codec that is supported by the first device or by transcoding to a DivX codex according to the user setup information. The contents modified by the content modifying unit 1012 is transmitted to the content receiving device 1030 interconnected via the network 1020, via the communication unit 1014. Also, alternatively, the content modifying unit 1012 may modify the attributes of contents by resizing the contents into a format that can be received by the content receiving device 1030 in consideration of a size of the contents to be transmitted and a residual storage space of the content receiving device 1030.

The content receiving device 1030 includes the communication unit 1031, the storing unit 1032, the user interface 1033, and a control unit 1034.

The user interface 1033 corresponds to an input unit that allows a user to display a list of contents provided by the content providing device 1010 and to select contents and attributes of the contents the user wants to receive.

The communication unit 1031 transmits contents information and status information of the content receiving device 1030 selected via the user interface 1033 to the content providing device 1010. The storage unit 1032 stores the contents received from the content providing device 1010, and the control unit 1034 controls each of elements of the contents receiving device 1030.

Figure 12A:
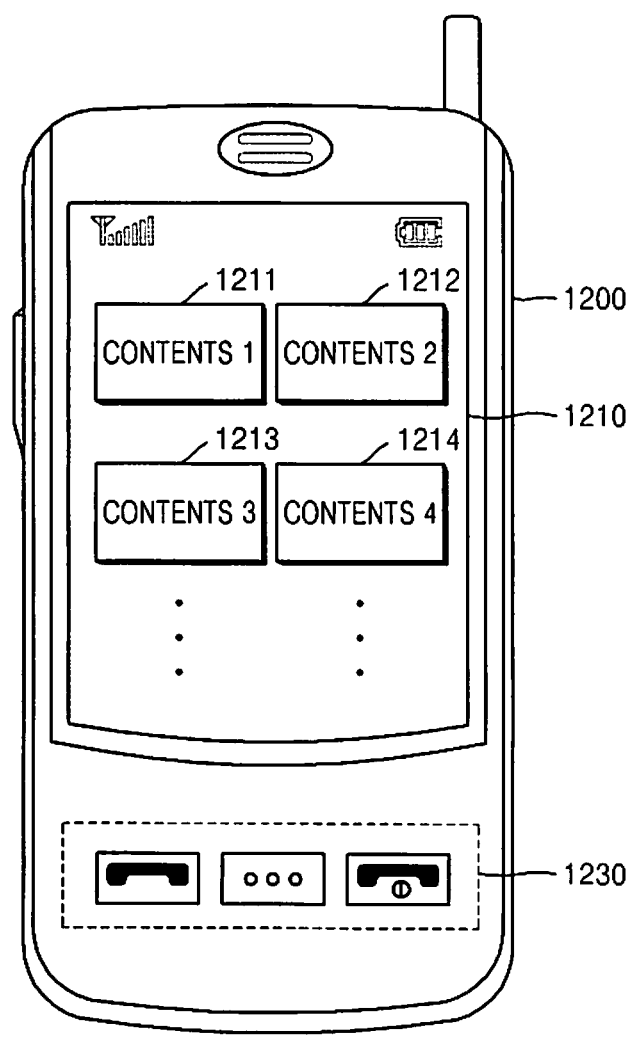
FIGS. 12A through 12D illustrate a process in which contents are received according to device status information of a content receiving device, according to an embodiment of the present invention.
Figure 12B:
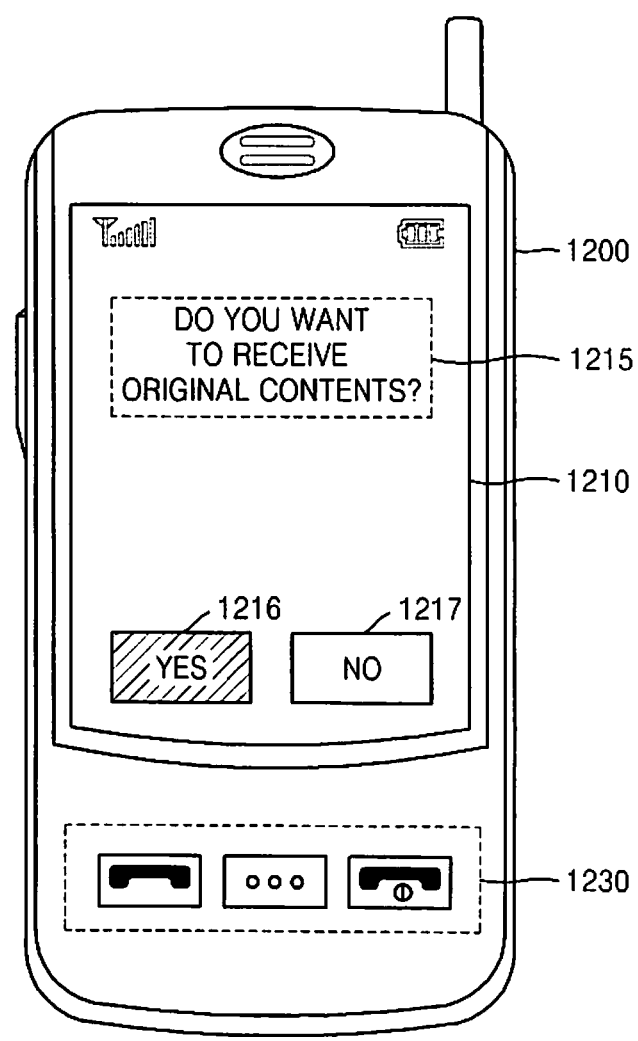
Figure 12C:
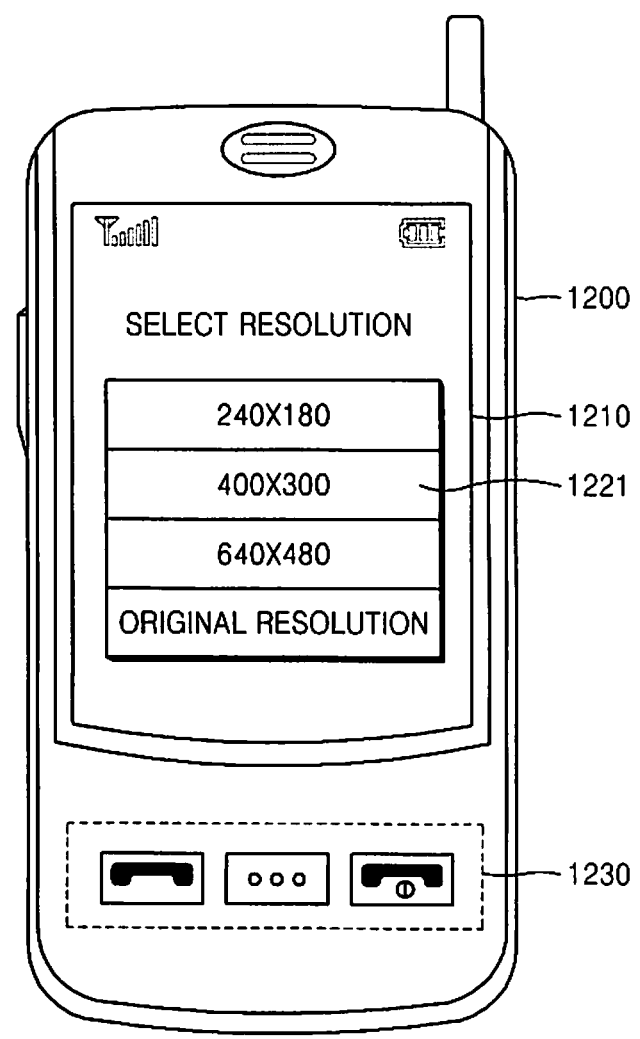
Figure 12D:
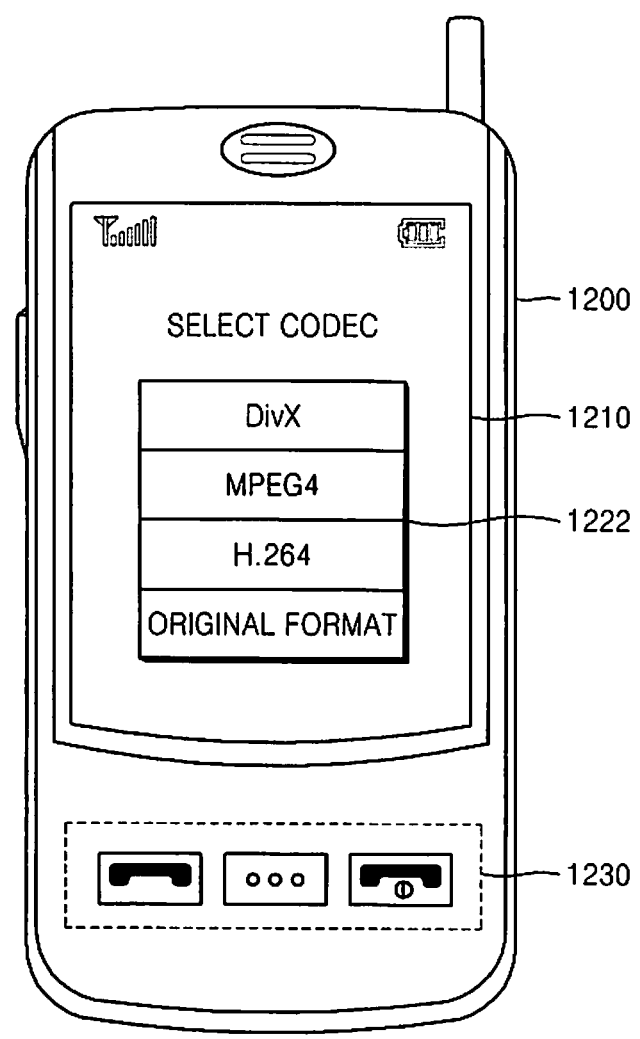

FIGS. 12A through 12D illustrate a process in which contents are received according to device status information of a content receiving device, according to an embodiment of the present invention. FIGS. 12A and 12D illustrate a mobile communication terminal 1200 as a content receiving device that supports a network connection. Also, video contents are described as the contents being received by the mobile communication terminal 1200 in FIGS. 12A through 12D.

Referring to FIG. 12A, when the mobile communication terminal 1200 which supports the network connection is connected to a content providing device via a network such as Wi-Fi, 3G, etc., the content providing device provides a contents list of contents 1211 through 1214 to a display unit 1210 of the mobile communication terminal 1200. The user selects one of the contents 1211 through 1214 via a predetermined input unit 1230 or by touching an area displaying desired contents if the mobile communication terminal 1200 supports touch recognition. Referring to FIG. 12B, when contents are selected by the user, an input window 1215 that inquires whether to receive the contents are displayed on the display unit 1210, and the user selects whether to receive the contents via the input unit 1230 or a selection interface 1216 or 1217.

Referring to FIG. 12C, when the user selects to receive contents, an input window 1221 for selecting a resolution of the contents to be received is displayed on the display unit 1210. The user selects a resolution of the contents to be received, via the input unit 1230 or by touching an area displaying a desired resolution.

Referring to FIG. 12D, after the user has selected the resolution of the contents, an input window 1222 for selecting a codec of the contents to be received, is displayed on the display unit 1210. The user may select a codec of the contents to be received, via the input unit 1230 or by touching an area displaying a desired codec.

As illustrated in FIGS. 12A through 12D, user setup information determined according to the selection by the user in the content receiving device is transmitted to the content providing device, and the content providing device may determine attributes of the contents according to the user setup information as described above to thereby provide the modified contents to the content receiving device. Also, when there is no user setup information or the user has automatically selected contents transfer, the content providing device may modify the attributes of the contents to be suitable for the performance of the content receiving device to provide modified contents.

Figure 13:
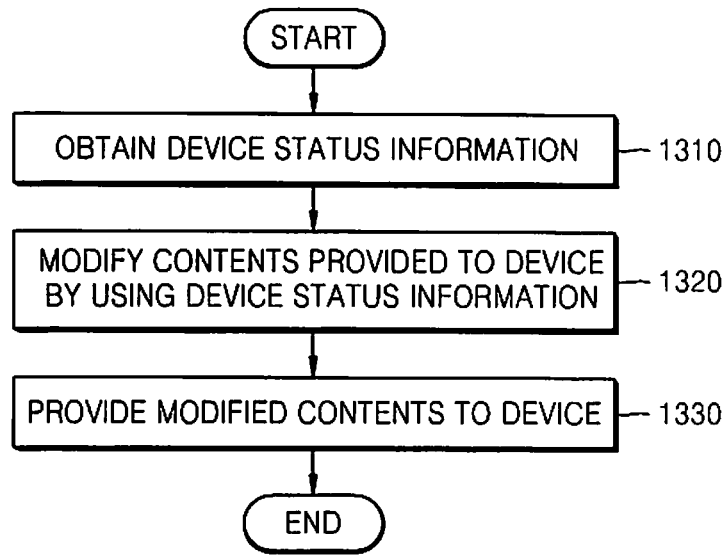
FIG. 13 is a flowchart illustrating a content providing method according to another embodiment of the present invention.

FIG. 13 is a flowchart illustrating a content providing method according to another embodiment of the present invention.

Referring to FIG. 13, in step 1310, the content providing device 1010 obtains device status information of the content receiving device 1030. As described above, the device status information may include a resolution available in the content receiving device 1030, a residual capacity of the content receiving device 1030, and a file codec supported by the content receiving device 1030.

In step 1320, the content providing device 1010 modifies attributes of contents provided to the content receiving device 1030 by using the device status information of the content receiving device 1030.

In step 1330, the content providing device 1010 provides the modified contents to the content receiving device 1030 via a network.

Figure 14:
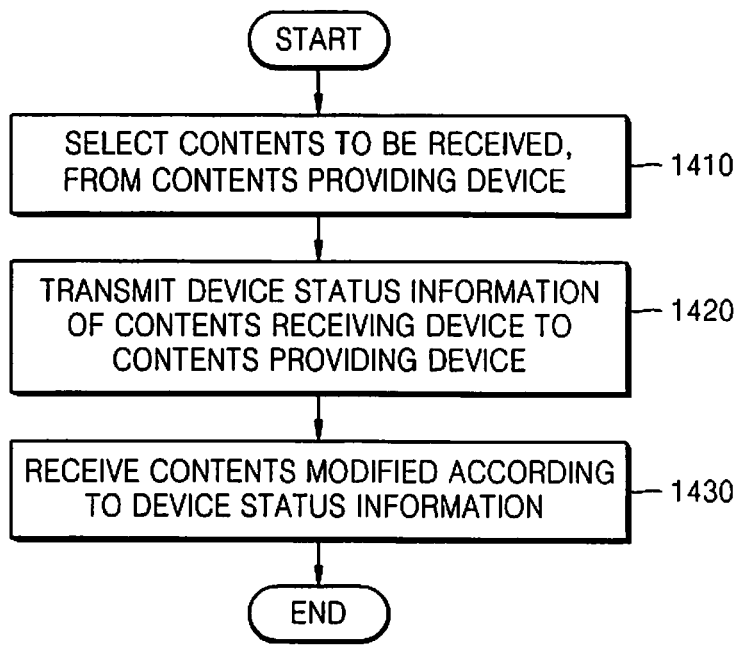
FIG. 14 is a flowchart illustrating a content receiving method according to another embodiment of the present invention.

FIG. 14 is a flowchart illustrating a content receiving method according to another embodiment of the present invention.

Referring to FIG. 14, in step 1410, contents to be received are selected among contents provided by the content providing device 1010 via the user interface 1033 of the content receiving device 1030.

In step 1420, the content receiving device 1030 transmits device status information thereof to the content providing device 1020.

In step 1430, the content providing device 1010 modifies attributes of contents to be suitable for the content receiving device 1030 by using the received device status information and transmits the modified contents to the content receiving device 1030, and the content receiving device 1030 receives the modified contents.

According to the present invention, by providing contents that are suitable for the performance of the contents receiving device or user setup information, compatibility of the contents may be improved, and convenience in use of the contents may be improved.

Hereinafter, embodiments of a backup apparatus according to the present invention are described in detail. The terms "storage device" used herein refers to any data storage device ranging from exclusive storage devices, such as hard disks, memory, CDs, DVDs, Blu-ray, HD-DVDs, and holographic recording media, to devices such as PC, notebooks, netbooks, camcorders, mobile communication terminals, HMS (Home Media Servers), and PVR (Personal Video Recorders), capable of storing data transferred from another device connected via a network.

Figure 15:
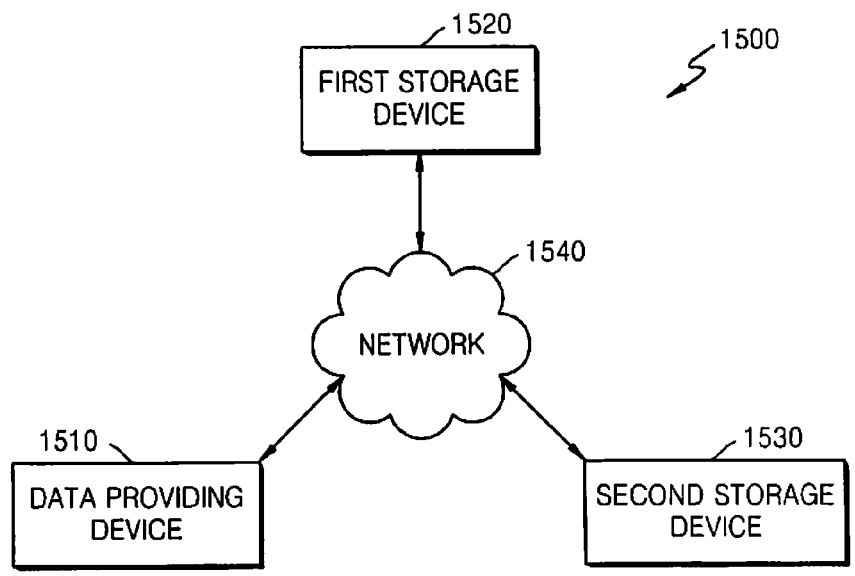
FIG. 15 is a schematic view illustrating a data backup system for backing up data via a network, according to an embodiment of the present invention.

FIG. 15 is a schematic view illustrating a data backup system 1500 for backing up data via a network, according to an embodiment of the present invention.

Referring to FIG. 15, the data backup system 1500 includes a data providing device 1510, a first storage device 1520 and a second storage device 1502 that are interconnected via a network 1540. Although not shown, the data backup system 1500 may further include a plurality of storage devices, in addition to the first storage device 1520 and the second storage device 1530.

The data providing device 1510 may be any of a variety of devices supporting various types of wired or wireless networks 1540, for example, a PMP, a UMPC, a netbook, a laptop computer, a mobile phone, a digital camera, a PVR, an HMS, or a PC. The data providing device 1510, the first storage device 1520 and the second storage device 1530 may each be a client device configuring a home network system connected to a controller such as a home gate or a home server. For example, the data providing device 1510, the first storage device 1520 and the second storage device 1530 may be devices interconnected via the network 1540 complying with a DLNA standard for control home electronic appliances to share data.

The network 1540 comprises one of a short-distance network and a long-distance network. The network 1540 may use a wireless Internet scheme such as Bluetooth®, Wi-Fi, WiBro, UWB, or the like, or a wired Internet scheme such as IEEE 1394, Ethernet, or the like.

The first storage device 1520 and the second storage device 1530 store data provided by the data providing device 1510. The first storage device 1520 and the second storage device 1530 may be any storage devices, including exclusive storage devices such as hard disks, memory, and NAS devices, and secondary storage devices having additional functions to store data transferred via a network from another device connected thereto. Examples of secondary storage devices include PC, notebooks, netbooks, camcorders, mobile communication terminals, HMS, and PVR.

The data providing device 1510 transfers data stored for backup to the first storage device 1520 and the second storage device 1530 via the network 1540. The data providing device 1510 may select a storage device for backing up data from among the first storage device 1520 and the second storage device 1530 connected via the network 1540. Alternatively, a management server of the network 1540 may determine the availability of the first storage device 1520 and the second storage device 1530 to select a storage device for backing up data. An embodiment in which data is backed up when the first storage device 1520 is unavailable to store backup data, will now be described.

According to the present invention, if the first storage device 1520 is unavailable to back up data, for example, when a residual storage capacity of the first storage device 1520 is insufficient to store the data so that the first storage 1500 cannot store the data transferred from the data providing device 1510, the data backup system 1520 may store the data in the second storage device 1530 connected via the network 1540, and may transfer the data stored in the second storage device 1530 to the first storage device 1520 when the first storage device 1520 becomes available to back up data, for example, by deletion of data stored in the first storage device 1520.

The data backup process may be controlled by the data providing device 1510, the management server of the network 1540, the first storage device 1520, and the second storage device 1530. Hereinafter, embodiments of controlling the data backup process by the devices constituting the data backup system 1500 will be described in detail.

Figure 16:
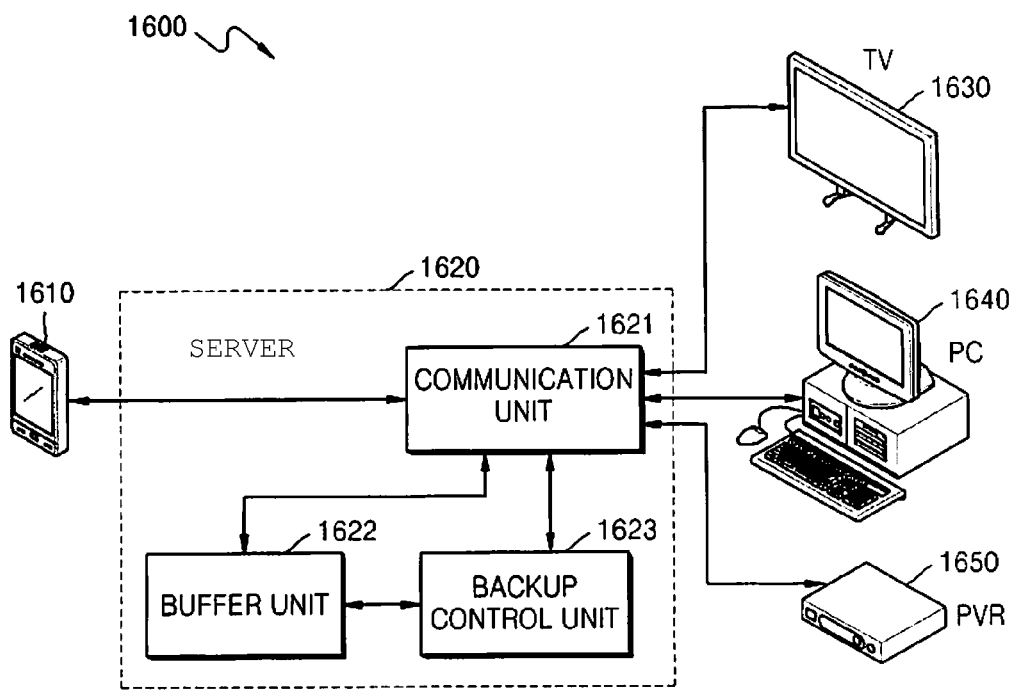
FIG. 16 illustrates the structure of a data backup system according to an embodiment of the present invention.

FIG. 16 illustrates the structure of a data backup system 1600 according to an embodiment of the present invention. FIG. 16 also illustrates a block diagram of a server 1620 of a network that controls a data backup process. Referring to FIG. 16, a data providing device 1610 may be a mobile communication terminal. Storage devices 1630, 1640, and 1650 may include a TV, a PC, and a PVR, respectively.

Referring to FIG. 16, the server 1620 includes a communication unit 1621, a buffer 1622, and a backup control unit 1623. The communication unit 1621 receives backup data provided by the data providing device 1610 connected via the network. The received backup data may be temporarily stored in the buffer 1622. The backup control unit 1623 determines the availability of the storage devices 1630-1940 connected via the network to store the backup data. The server 1620 may be spontaneously notified by the storage devices 1630-1650 about their availability to store the backup data. Alternatively, if the data providing device 1610 requests data backup, the backup control unit 1623 may determine the availability of the storage devices 1630-1650 to store the backup data by requesting and receiving information about the availability of the storage devices 1630-1650 via the communication unit 1621.

The backup control unit 1623 of the server 1620 selects one of storage devices 1630-1650 to which the backup data is to be transferred, based on the availability of the storage devices 1630-1650 to store the backup data.

As an example, it is assumed that the first storage device 1630 is a central storage device to store backup data transferred via the network and has an insufficient residual capacity to store the backup data. In this case, the backup control unit 1623 may select one of the second storage device 1640 and the third storage device 1650 available to store the backup data via the network, and may control the buffer 1622 and the communication unit 1621 to transfer the backup data stored in the buffer 1622 to the selected storage device. Alternatively, instead of controlling selection of one of a plurality of available storage devices and transfer of the backup data, the backup control unit 1623 may divide the backup data based on the residual capacities of the available storage devices and store the backup data in the available storage devices in a distributed manner. For example, if the residual capacities of the second storage device 1640 and the third storage device 1650 are 20 GB and 40 GB, respectively, and the backup data has a size of 60 GB, the backup control unit 1623 may control the backup operation to divide the backup data of 60 GB into 20 GB and 40 GB data units and store the divided backup data units in the second storage device 1640 and the third storage device 1650 in a distributed manner.

After storage of the backup data is completed, the backup control unit 1623 periodically communicates with the first storage device 1630 to periodically check the availability of the first storage device 1630 to store the backup data. If the residual capacity of the first storage device 1630 is increased to make it available for backup, for example, by deletion of data stored in the first storage device 1630, the backup control unit 1623 may control the backup operation to transfer the backup data stored in the second storage device 1640 or the third storage device 1650 to the first storage device 1630 and store the backup data in the storage device 1630. If the transfer and storage of the backup data in the first storage device 1630 is completed, the backup data temporarily stored in the second storage device 1640 or the third storage device 1650 due to the insufficient residual capacity of the first storage device 1630 may be deleted.

Figure 17:
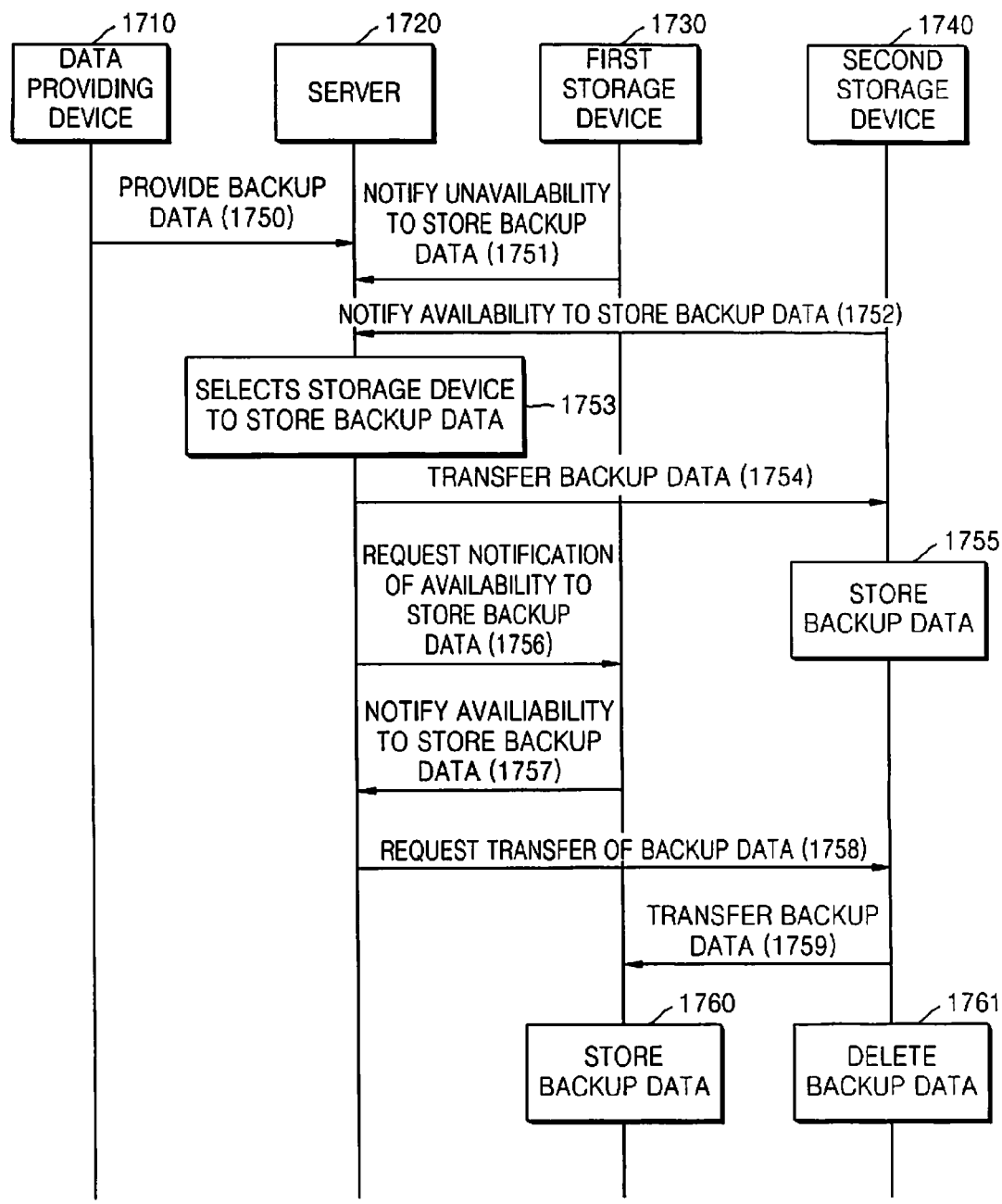
FIG. 17 is a flow diagram illustrating an embodiment of a data backup method by which data is backed up to a network server of a data backup system.

FIG. 17 is a flow diagram illustrating a data backup process by a network server of a data backup system, according to an embodiment of the present invention.

Referring to FIG. 17, in step 1750 a data providing device 1710 provides backup data to a server 1720. The server 1720 may request information about the availability of a first storage device 1730 and a second storage device 1740, connected via a network, to store the backup data. Alternatively, the first storage device 1730 may spontaneously notify the server 1720 that the first storage device 1730 is unavailable to store the backup data in step 1751. The second storage device 1740 may spontaneously notify the server 1720 that the second storage device 1740 is available to store the backup data in step 1752.

In step 1753 the server 1720 selects a storage device to store the backup data based on the availability of the first and second storage devices 1730 and 1740. The embodiment of FIG. 17 assumes that the first storage device 1730 is unavailable to store the backup data and the second storage device 1740 is available to store the backup data.

In step 1754 the server 1720 transfers the backup data to the available second storage device 1740. In step 1755 the second storage device 1740 stores the transferred backup data.

After the storage of the backup data in the second storage device 1740 is completed, in step 1756 the server 1720 periodically requests to be notified about the availability of the first storage device 1730 to store backup data. In step 1757 the first storage device 1730 notifies the server 1720 that the first storage device 1730 is available to store the backup data if the residual capacity of the first storage device 1730 is increased, for example, by deletion of data previously stored in the first storage device 1730.

If the first storage device 1730 is available to store the backup data, in step 1758 the server 1720 requests the second storage device 1740 to transfer the backup data to the first storage device 1730. In step 1759 the second storage device 1740 transfers the backup data to the first storage device 1730. In step 1760 the first storage device 1730 stores the transferred backup data. In step 1761 the backup data temporarily stored in the second storage device 1740 prior to being transferred to the first storage device 1730 is deleted from the second storage device 1740.

Figure 18:
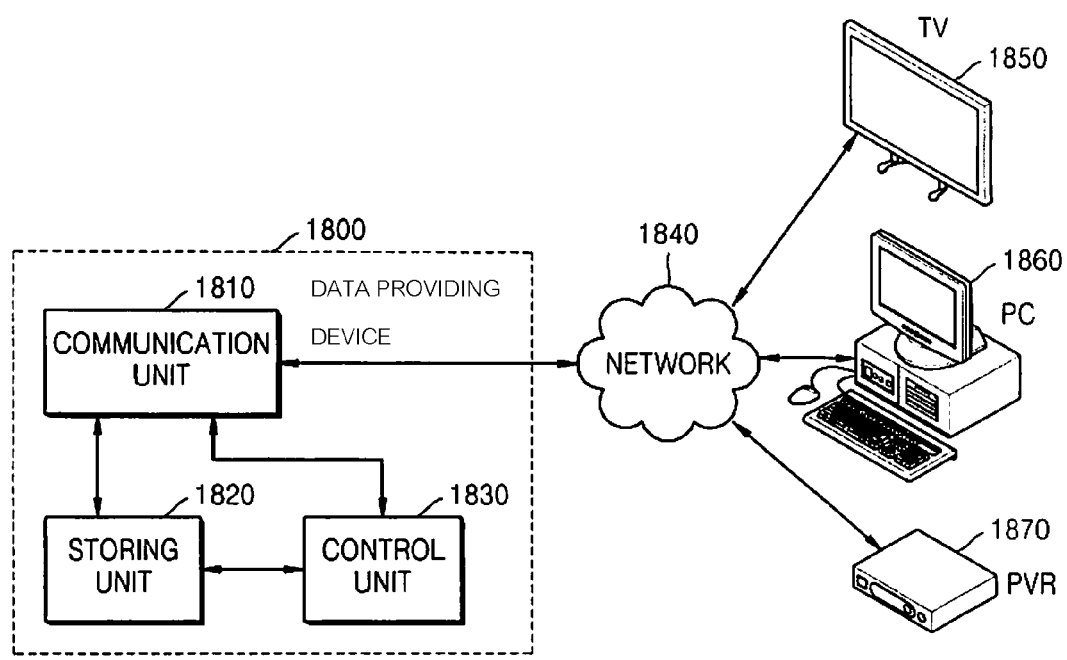
FIG. 18 illustrates the structure of a data backup system according to another embodiment of the present invention.

FIG. 18 illustrates the structure of a data backup system according to another embodiment of the present invention. FIG. 18 includes a block diagram of a data providing device 1800 that controls data backup.

Referring to FIG. 18, the data providing device 1800 includes a communication unit 1810, a storing unit 1820, and a control unit 1830. The communication unit 1810 transfers backup data to be stored in the storing unit 1820 to a plurality of storage devices 1850, 1860 and 1870. The control unit 1830 determines the availability of the storage devices 1850-1870 connected via the network, to store the backup data. The availability of the storage devices 1850-1870 may be previously notified by the storage devices 1850-1870 about the availability of the storage devices 1850-1870 to store the backup data. Alternatively, the control unit 1830 of the data providing device 1800 may determine the availability of the storage devices 1850-1870 by requesting and receiving information about the availability of the storage devices 1850-1870 via the communication unit 1810.

The control unit 1830 of the data providing device 1800 selects one of storage devices 1850-1970 to which the backup data is to be transferred, based on the availability of the storage devices 1850-1870 to store the backup data.

As described above, it is assumed that the first storage device 1850 is a central storage device for storing backup data transferred via the network and has a residual capacity insufficient to store the backup data. In this case, the control unit 1830 may select one of the second storage device 1860 and the third storage device 1870 available to store the backup data via the network, and may control the storing unit 1820 and the communication unit 1810 to transfer the backup data stored in the storing unit 1820 to the selected storage device. Alternatively, instead of controlling selection of one of a plurality of available storage devices and transfer of the backup data to the selected storage device, the control unit 1830 may divide the backup data based on the residual capacities of the available storage devices and store the backup data in the available storage devices in a distributed manner.

After storage of the backup data is completed, the control unit 1830 periodically communicates with the first storage device 1850 to periodically check the availability of the first storage device 1850 to store the backup data. If the residual capacity of the first storage device 1850 is increased to make it available for backup, for example, by deletion of data stored in the first storage device 1850, the control unit 1830 may control the backup operation to transfer the backup data stored in the second storage device 1860 or the third storage device 1870 to the first storage device 1850 and store the backup data in the first storage device 1850. If the transfer and storage of the backup data in the first storage device 1850 is completed, the backup data stored in the second storage device 1860 or the third storage device 1870 due to the insufficient residual capacity of the first storage device 1850 may be deleted.

Figure 19:
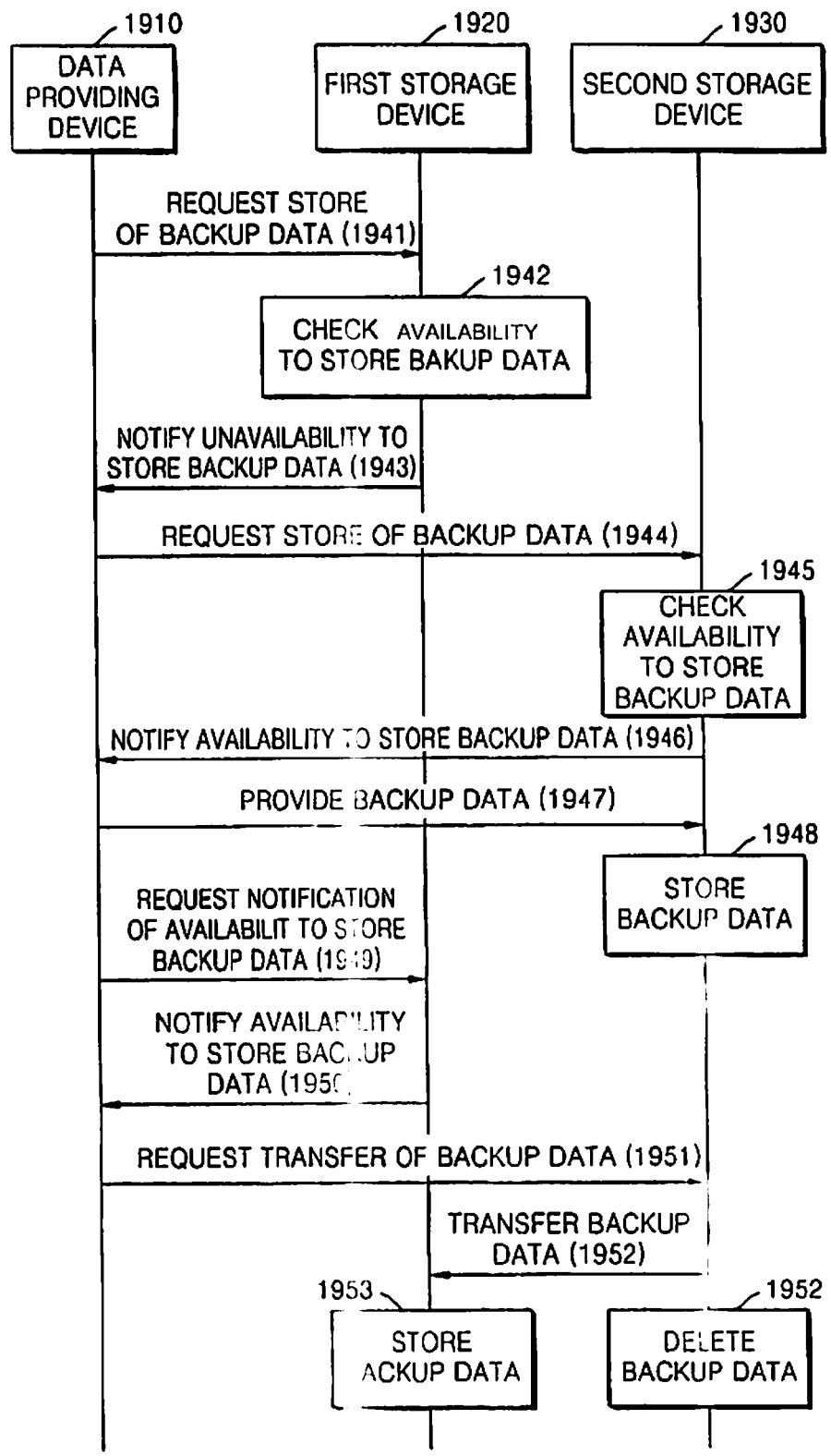
FIG. 19 is a flow diagram illustrating a data backup process by a data providing device of a data backup system, according to an embodiment of the present invention.

FIG. 19 is a diagram illustrating a data backup process by a data providing device 1910 of a data backup system, according to an embodiment of the present invention. Referring to FIG. 19, in step 1941 data providing device 1910 requests a first storage device 1920 to store backup data. In step 1942 the first storage device 1920 compares the size of the backup data and an available residual capacity of the first storage device 1920 to check the availability of the first storage device 1920 to store the backup data. If the first storage device 1920 is unavailable to store the backup data due to, for example, an insufficient residual capacity, in step 1943 the first storage device 1920 notifies the data providing device 1910 about that the first storage device 1920 is unavailable to store the backup data. In step 1944 the data providing device 1910 requests another storage device, i.e., the second storage device 1930, connected via the network to store the backup data. In step 1945 the second storage device 1930 compares the size of the backup data and an available residual capacity of the second storage device 1930 to check the availability of the second storage device 1930 to store the backup data. If the second storage device 1930 is available to store the backup data, in step 1946 the second storage device 1930 notifies the data providing device 1910 about the availability of the second storage device 1930 to store the backup data. In step 1947 the data providing device 1910 transfers the backup data to the second storage device 1930. In step 1948 the second storage device 1930 stores the transferred backup data.

After the storage of the backup data in the second storage device 1930 is completed, in step 1949 the data providing device 1910 periodically requests to be notified about the availability of the first storage device 1920 to store backup data. In step 1950 the first storage device 1920 notifies the data providing device 1910 about that the first storage device 1920 is available to store the backup data since the residual capacity of the first storage device 1920 is increased, for example, by deletion of the data stored in the first storage device 1920.

If the first storage device 1920 is available to store the backup data, in step 1951 the data providing device 1910 requests the second storage device 1930 to transfer the backup data to the first storage device 1920. In step 1952 the second storage device 1930 transfers the backup data to the first storage device 1920. In step 1953 the first storage device 1920 stores the transferred backup data. In step 1954 the backup data stored in the second storage device 1930 prior to being transferred to the first storage device 1920 is deleted from the second storage device 1930.

Figure 20:
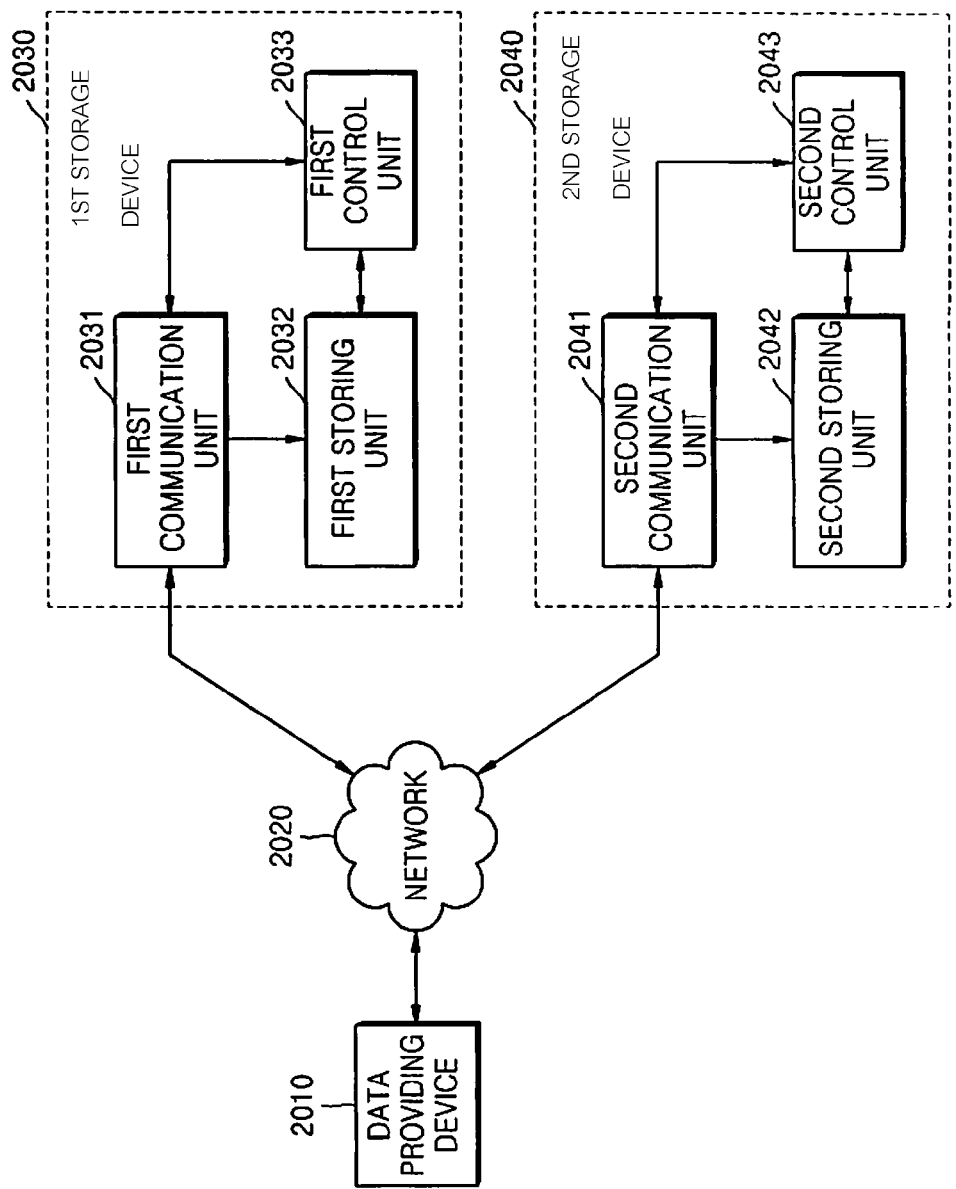
FIG. 20 illustrates the structure of a data backup system according to an embodiment of the present invention.

FIG. 20 illustrates the structure of a data backup system according to an embodiment of the present invention. FIG. 20 also illustrates a block diagram of storage devices 2030 and 2040 that controls the data backup process.

Referring to FIG. 20, the first storage unit 2030 includes a first communication unit 2031, a first storing unit 2032, and a first control unit 2033. The second storage unit 2040 includes a second communication unit 2042, a second storing unit 2042, and a second control unit 2043. Hereinafter, an embodiment in which the first storing device 2030 is unavailable to backup data, and the second storage unit 2040 is available to backup data will be described in detail.

The first communication unit 2031 communicates with a data providing device 2010 and a second storage unit 2040 via a network 2020. If the data providing device 2010 requests data backup, the first control unit 2033 compares an available residual capacity of the first storing unit 2032 and a size of the backup data and controls the first communication unit 2031 to notify the data providing device 2010 whether the first storing unit 2032 is available to store the backup data. As described above in the previous embodiment, if the first storage unit 2032 has an insufficient residual capacity and is unavailable to store the backup data, the first communication unit 2031 notifies the data providing device 2010 about the unavailability of the first storing unit 2032 to store the backup data.

If the first storage device 2030 is unavailable to store the backup data, the data providing device 2010 requests the second storage device 2040 to store the backup data. A second control unit 2043 of the second storage device 2040 compares an available residual capacity of the second storing unit 2042 and a size of the backup data and controls the second communication unit 2041 to notify the data providing device 2010 whether the second storing unit 2042 is available or not to store the backup data. As described in the previous embodiment, the fact that the second storing unit 2042 has a sufficient residual capacity to store the backup data is notified to the data providing device 2010. When the data providing device 2010 is notified about the availability of the second storing unit 2042 to store the backup data, the data providing device 2010 transfers the backup data to the second communication unit 2041.

The backup data is transferred via the second communication unit 2041 and stored in the second storing unit 2042. After the storage of the backup data is completed, the second control unit 2043 periodically communicates with the first storage device 2030 to periodically check the availability of the first storage device 2030 to store the backup data. If the residual capacity of the first storage device 2030 is increased to make it available for backup, for example, by deletion of data stored in the first storing unit 2032, the second control unit 2043 may control the backup operation to transfer the backup data stored in the second storing unit 2042 to the first storing unit 2032 and store the backup data in the first storage device 2030. If the transfer of the backup data to the first storage device 2030 is completed, the second control unit 2043 deletes the backup data that had been stored in the second storing unit 2042. If the backup data stored in the second storage device 2040 is transferred and stored in the first storage device 2030, the first control unit 2033 of the first storage device 2030 or the second control unit 2043 of the second storage device 2040 may control the communication unit to notify the data providing device 2010 about the transfer of the backup data from the second storage device 2040 to the first storage device 2030 in order for the data providing device 2010 to check a storage location of the backup data. The first control unit 2033 of the first storage device 2030 or the second control unit 2043 of the second storage device 2040 may provide other storage devices connected via the network with a list of data stored in the first storage device 2030 or the second storage device 2040 in order to prevent overlapping storage of identical data in different storage devices connected via the network.

Figure 21:
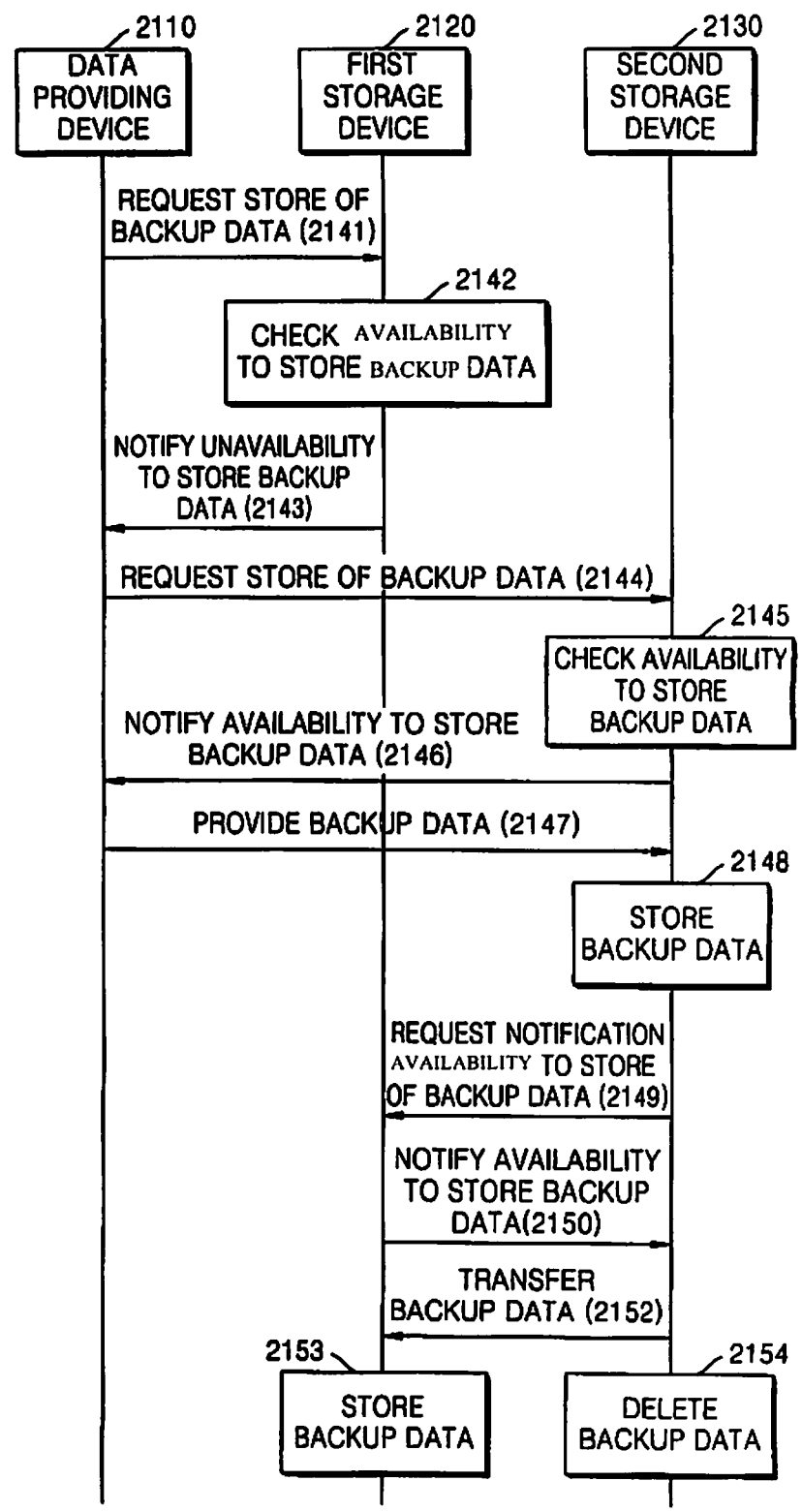
FIG. 21 is a flow diagram illustrating a data backup process by a storage device of a data backup system, according to an embodiment of the present invention.

FIG. 21 is a flow diagram illustrating a data backup process by a storage device of a data backup system, according to an embodiment of the present invention.

Referring to FIG. 21, in step 2141 a data providing device 2110 requests a first storage device 2120 to store backup data. In step 2142 the first storage device 2120 compares the size of the backup data and an available residual capacity of the first storage device 2120 to check the availability of the first storage device 2120 to store the backup data. If the first storage device 2120 is unavailable to store the backup data due to, for example, an insufficient residual capacity, in step 2143 the first storage device 2110 notifies the data providing device 2110 that the first storage device 2110 is unavailable to store the backup data. In step 2144 the data providing device 2110 requests another storage device, i.e., the second storage device 2130, connected via the network, to store the backup data. In step 2145 the second storage device 2130 compares the size of the backup data and an available residual capacity of the second storage device 2130 to check the availability of the second storage device 2130 to store the backup data. If the second storage device 2130 is available to store the backup data, in step 2146 the second storage device 2130 notifies the data providing device 2110 about the availability of the second storage device 2130 to store the backup data. In step 2147 the data providing device 2110 transfers the backup data to the second storage device 2130. In step 2148 the second storage device 2130 stores the transferred backup data.

After the storage of the backup data in the second storage device 2130 is completed, in step 2149 the second storage device 2130 periodically requests to be notified about the availability of the first storage device 2120 to store the backup data. In step 2150 the first storage device 2120 notifies the second storage device 2130 about that the first storage device 2120 is available to store the backup data since the residual capacity of the first storage device 2120 is increased, for example, by deletion of the data stored in the first storage device 2120.

If the first storage device 2120 is available to store the backup data, in step 2152 the second storage device 2130 transfers the backup data to the first storage device 2130. In step 2153 the first storage device 2120 stores the transferred backup data. In step 2154 the backup data stored in the second storage device 2130 prior to being transferred to the first storage device 2120 is deleted from the second storage device 2130.

Figure 22:
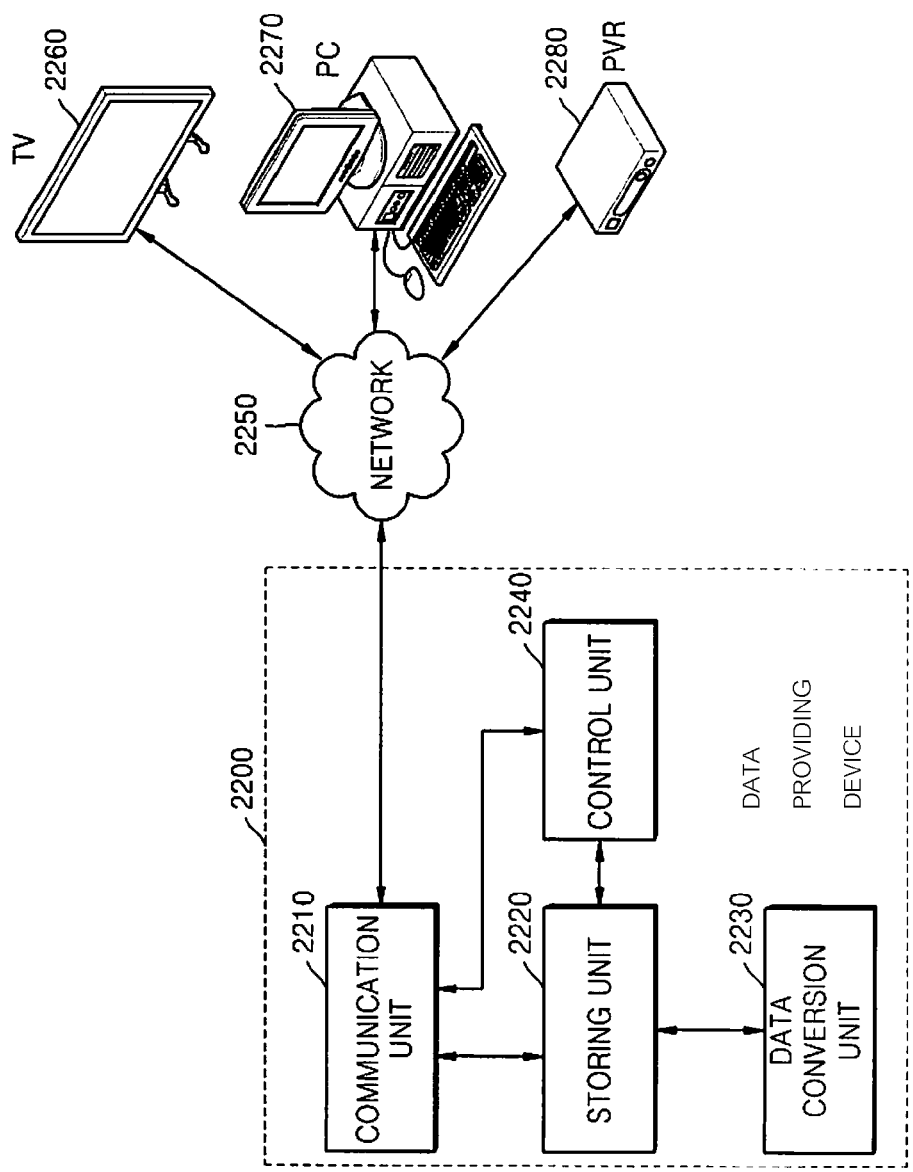
FIG. 22 illustrates the structure of a data providing device according to an embodiment of the present invention.

FIG. 22 illustrates the structure of a data providing device 2200 according to an embodiment of the present invention.

Referring to FIG. 22, the data providing device 2200 includes a communication unit 2210, a storing unit 2220, a data conversion unit 2230, and a control unit 2240.

The communication unit 2210 transfers backup data stored in the storing unit 2220 to a plurality of storage devices 2260, 2270 and 2280 via a network 2250.

The data providing device 2200 may back up data to the storage devices 2260, 2270 and 2280 connected via the network 2250 in a similar manner as the data backup processes of the data providing devices 1800 and 1910 described above with reference to FIGS. 18 and 19. Thus, a detailed description of a data backup process by the data providing device 2200 will not provided herein However, in the data providing device 2200 of FIG. 22, if storage of the backup data to at least one of the storage devices 2060-2080 connected via the network 2250 in a distributed manner is completed, the data conversion unit 2230 may generate metadata about the storage location of the backup data and may store the original data stored in the storing unit 2220 via compression conversion.

For example, if the data providing device 2200 is a digital camera, after completion of storing backup data of original image data captured by the digital providing apparatus 2200 in at least one of the storage devices 2260-2280 in a distributed manner, the data conversion unit 2230 may convert the original image data to thumbnail images, and the converted thumbnail images are stored in the storing unit 2220 instead of the original image and the original image may be deleted from the data providing device 2200. The data conversion unit 2230 may generate metadata from the location information, such as a URL, of the storage device storing the original image data and may store the metadata together with the thumbnail images. If the original image data is required later, the thumbnail images and the metadata of the original image data, which correspond to the location information of the original image data, may be used to acquire the original image data from the storage device in which the original image data is backed up. Although in the current embodiment the data conversion unit 2230 converts the backup data into thumbnail form, the data conversion unit 2230 may convert the original data in various forms, for example, by compression conversion to increase the utilization efficiency of the storage space of the storing unit 2220.

According to the present invention, when a storage device connected to a network is unavailable to store backup data, data may be efficiently backed up to other storage devices connected to the network. Convenience of access to the original contents may be improved by using metadata of the contents. By providing contents that are suitable for the performance of the contents receiving device, compatibility of the contents may be improved.

The embodiments of the present invention can be written as computer programs that can be executed in computers, and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all modifications within the scope will be construed as being included in the present invention.

What is claimed is:

1. A method of providing content, the method comprising:
storing, by a first device, an original content at a location and information identifying users who have access rights to the original content stored at the location;
sending, by a second device, an image associated with the original content along with both access information for allowing an authorized user to access the original content stored at the location and location information for identifying the location at which the original content is stored, to a third device used by a user;
receiving, by the first device, a request for the original content from the user, wherein the request is based on the location information and the access information for allowing the authorized user to access the original content stored at the location; and
determining, by the first device, whether to provide the original content as a response to the request, based on the request for the original content and the information identifying users who have access rights to the original content stored at the location.

2. The method of claim 1, wherein the original content is an image content, and
wherein the image associated with the original content comprises reduced image content having a resolution lower than a resolution of the original content.

3. The method of claim 1, wherein the original content is an image content, and
wherein the image associated with the original content comprises reduced image content having a file size smaller than a file size of the original content.

4. The method of claim 1, wherein the location information comprises a uniform resource locator (URL).

5. The method of claim 1, wherein the request comprises a request to access the location indicated by the location information.

6. The method of claim 1, wherein the sending comprises sending user information regarding a user of the image in addition to sending the image, the access information and the location information.

7. The method of claim 1, wherein the sending comprises sending editing history including information indicating format of the original content in addition to sending the image, the access information and the location information.

8. The method of claim 1, wherein the image is generated by modifying attributes of the original content.

9. The method of claim 1, wherein the location information for identifying the location sent by the second device is encoded.

10. A system for providing content, the system comprising:
a first device comprising at least one processor configured to control the first device to store an original content at a location and information identifying users who have access rights to the original content stored at the location; and a second device comprising at least one processor configured to control the second device to send an image associated with the original content along with both access information for allowing an authorized user to access the original content stored at the location and location information for identifying the location at which the original content is stored, to a third device used by a user, wherein the first device recieves a request for the original content from the user, the request being based on the location information and the access information for allowing the authorized user to access the original content stored at the location; and wherein the first device determines whether to provide the original content as a response to the request, based on the request for the original content and the information identifying users who have access rights to the original content stored at the location.

11. The system of claim 10, wherein the original content is an image content, and
wherein a quality of the image associated with the original content is lower than a quality of the original content.

12. The system of claim 10, wherein the original content is an image content, and
wherein a resolution of the image associated with the original content is lower than a resolution of the original content.

13. The system of claim 10, wherein the original content is an image content, and
wherein a file size of the image associated with the original content is smaller than a file size of the original content.

14. The system of claim 10, wherein the location information comprises a uniform resource locator (URL).

15. The system of claim 10, wherein the request comprises a request to access the location indicated by the location information.

16. The system of claim 10, wherein the location information is a uniform resource locator (URL) indicating a storage path of the original content on the first device.

17. The system of claim 10, wherein the second device sends user information regarding a user of the image in addition to the image, the access information and the location information.

18. The system of claim 10, wherein the second device sends editing history including information indicating format of the original content in addition to the image, the access information and the location information.

19. The system of claim 10, wherein the image is generated by modifying attributes of the original content.

20. The system of claim 10, wherein the location information for identifying the location sent by the second device to the third device is encoded.

21. A non-transitory computer-readable recording medium having embodied thereon computer-readable codes, which, when executed by a system, cause the system to execute a method of providing content, the method comprising:

storing, by a first device, an original content at a location and information identifying users who have access rights to the original content stored at the location;

sending, by a second device, an image associated with the original content along with both access information for allowing an authorized user to access the original content stored at the location and location information for identifying the location at which the original content is stored, to a third device used by a user; and recieving, by the first device, a request for the original content from the user, wherein the request is based on the location information and the access information for allowing the authorized user to access the original content stored at the location; and determining, by the first device, whether to provide the original content as a response to the request, based on the request for the original content and the information identifying users who have access rights to the original content stored at the location.

22. The non-transitory computer-readable recording medium of claim 21, wherein the original content is an image content, and
wherein a resolution of the image associated with the original content is lower than a resolution of the original content.

23. The non-transitory computer-readable recording medium of claim 21, wherein the original content is an image content, and
wherein a file size of the image associated with the original content is smaller than a file size of the original content.

24. The non-transitory computer-readable recording medium of claim 21, wherein the location information comprises a uniform resource locator (URL).

25. The non-transitory computer-readable recording medium of claim 21, wherein the location information is a uniform resource locator (URL) indicating a storage path of the original content on the server.

26. The non-transitory computer-readable recording medium of claim 21, wherein the sending comprises sending user information regarding a user of the image in addition to sending the image, the access information and the location information.

27. The non-transitory computer-readable recording medium of claim 21, wherein the sending comprises sending editing history including information indicating format of the original content in addition to the image, the access information and the location information.

28. The non-transitory computer-readable recording medium of claim 21, wherein the image is generated by modifying attributes of the original content.

29. The non-transitory computer-readable recording medium of claim 21, wherein the location information for identifying the location sent by the second device is encoded.

* * * * *